(12) United States Patent
Devineni et al.

(10) Patent No.: US 10,084,559 B1
(45) Date of Patent: Sep. 25, 2018

(54) SYSTEM AND METHOD FOR MAINTAINING A TIME OF DAY IN A PORT OF A PHY MODULE

(71) Applicant: Marvell International Ltd., Hamilton (BM)

(72) Inventors: Ramya Krishna Devineni, Fremont, CA (US); Donald Pannell, Cupertino, CA (US); Hong Yu Chou, Saratoga, CA (US); Samuel Kong, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 341 days.

(21) Appl. No.: 15/060,732

(22) Filed: Mar. 4, 2016

Related U.S. Application Data

(60) Provisional application No. 62/129,519, filed on Mar. 6, 2015, provisional application No. 62/180,722, filed on Jun. 17, 2015.

(51) Int. Cl.
*H04J 3/06* (2006.01)
*H04L 7/04* (2006.01)
*H04L 7/00* (2006.01)

(52) U.S. Cl.
CPC .......... *H04J 3/0661* (2013.01); *H04J 3/0644* (2013.01); *H04L 7/042* (2013.01); *H04J 3/0635* (2013.01);
(Continued)

(58) Field of Classification Search
CPC ...... H04J 3/0635–3/0638; H04J 3/0644; H04J 3/0658–3/0667; H04J 3/00682; H04L 7/0008–7/0012; H04L 7/0016–7/0025; H04L 7/0037; H04L 7/04–7/042; H04L 7/10
See application file for complete search history.

(56) References Cited

U.S. PATENT DOCUMENTS

2006/0251084 A1* 11/2006 Elliot .................... H04J 3/0664
370/398
2009/0190613 A1   7/2009 Finn
(Continued)

OTHER PUBLICATIONS

U.S. Appl. No. 15/060,719, filed Mar. 4, 2016, Devineni et al.
(Continued)

*Primary Examiner* — Eric Myers

(57) ABSTRACT

A network device including a port having register and timing modules. The register module includes first ToD, loadpoint, and compensation registers. The timing module includes a second ToD register and ToD module and operates based on a local clock signal. The register module receives a ToD from a control module, which is separate from the network device and selects an initial hardware time. The ToD is a future time and is based on a grandmaster clock signal. The first ToD and loadpoint registers store the ToD and initial hardware time. The compensation register stores a compensation value from the control module and determined based on a difference between local and grandmaster clock signals. The ToD module, when local and initial hardware times match: transfers the ToD between first and second ToD registers; and updates the ToD in the second ToD register based on the local clock signal and compensation value.

23 Claims, 20 Drawing Sheets

(52) U.S. Cl.
CPC ........... *H04J 3/0682* (2013.01); *H04L 7/0037* (2013.01); *H04L 7/04* (2013.01)

(56) References Cited

U.S. PATENT DOCUMENTS

| | | | | |
|---|---|---|---|---|
| 2010/0135334 | A1* | 6/2010 | Briscoe | H04J 3/0664 370/503 |
| 2013/0279525 | A1 | 10/2013 | Zheng et al. | |
| 2014/0177653 | A1 | 6/2014 | Tzeng | |

OTHER PUBLICATIONS

IEEE Std. 802.11b; Supplement to IEEE Standard for Information technology—Telecommunications and information exchange between systems—Local and metropolitan area networks—Specific Requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999; 96 pages.

IEEE Std. 1588TM-2008 (Revision of IEEE Std. 1588-2002); IEEE Standard for a Precision Clock Synchronization Protocol for Networked Measurement and Control Systems; IEEE Instrumentation and Measurement Society; Sponsored by the Technical Committee on Sensor Technology (TC-9); Jul. 24, 2008; 289 pages.

IEEE Std. 1722TM-2011; IEEE Standard for Layer 2 Transport Protocol for Time-Sensitive Applications in Bridged Local Area Networks; IEEE Computer Society; Sponsored by the Microprocessor Standards Committee; May 6, 2011; 57 pages.

802.1AS—Timing and Synchronization; "Standard for Local and Metropolitan Area Networks—Timing and Synchronization for Time-Sensitive Applications in Bridged Local Area Networks"; Editor—Geoff Garner; May 25, 2006; 7 pages.

IEEE Std. 802.11-2012; IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Computer Society; Sponsored by the LAN/MAN Standards Committee; Mar. 29, 2012; 2793 pages.

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part11: Wireless LAN Medium Access Control (MAC) and Physical Layer (PHY) specifications: Hiqh-Speed Physical Layer in the 5 GHZ Band"; LAN/MAN Standards Committee of the IEEE Computer Society; Sep. 16, 1999; 91 pages.

IEEE Std. 802.11b; Supplement to IEEE Standard for Information technology—Telecommunications and information exchange between systems—Local and metropolitan area networks—Specific Requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 2009; 96 pages.

IEEE P802.11g/D8.2 Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; Apr. 2003; 69 pages.

IEEE Std 802.11h 2003 (Amendment to IEEE Std 802.11, 1999 Edition (Reaff 2003) as amended by IEEE Stds 802.11a 1999, 802.11b 1999, 802.11b 1999/Cor 1 -2001, 802.11d 2001, and 802.11g 2003); IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 5: Spectrum and Transmit Power Management Extensions in the 5 GHz band in Europe; IEEE Computer Society, Sponsored by the LAN/MAN Standards Committee; Oct. 14, 2003; 75 pages.

Kiran Gunnam et al.; "Multi-Rate Layered Decoder Architecture for Block LDPC Codes of the IEEE 802.11n Wireless Standard"; 2007; pp. 1645-1648.

802.16-2009 IEEE Standard for Local and Metropolitan area networks; Part 16: Air Interface for Broadband Wireless Access Systems; IEEE Computer Society and the IEEE Microwave Theory and Techniques Society; Sponsored by the LAN/MAN Standard Committee; May 29, 2009; 2082 pages.

IEEE Std 802.20-2008; IEEE Standard for Local and metropolitan area networks; Part 20: Air Interface for Mobile Broadband Wireless Access Systems Supporting Vehicular Mobility—Physical and Media Access Control Layer Specification; IEEE Computer Society; Sponsored by the LAN/MAN Standards Committee; Aug. 29, 2008; 1032 pages.

"Specification of the Bluetooth System" Master Table of Contents & Compliance Requirements—Covered Core Package version: 4.0; Jun. 30, 2010; 2302 pages.

IEEE P802.11ac / D2.1; Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6 GHz; Prepared by the 802.11 Working Group of the 802 Committee; Mar. 2012; 363 pages.

IEEE P802.11ad / D5.0 (Draft Amendment based on IEEE P802.11REVmb D10.0) (Amendment to IEEE 802.11REVmb D10.0 as amended by IEEE 802.11ae D5.0 and IEEE 802.11aa D6.0); Draft Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications—Amendment 3: Enhancements for Very High Throughput in the 60 GHz Band; Sponsor IEEE 802.11 Committee of the IEEE Computer Society; Sep. 2011; 601 pages.

IEEE P802.11ah / D1.0 (Amendment to IEEE Std 802.11REVmc / D1.1, IEEE Std 802.11ac / D5.0 and IEEE Std 802.11af / D3.0) Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation; Prepared by the 802.11 Working Group of the LAN/MAN Standards Committee of the IEEE Computer Society; Oct. 2013; 394 pages.

\* cited by examiner

SYSTEM AND METHOD FOR MAINTAINING A TIME OF DAY IN A PORT OF A PHY MODULE

CROSS-REFERENCE TO RELATED APPLICATIONS

This application claims the benefit of U.S. Provisional Application No. 62/129,519, filed on Mar. 6, 2015 and U.S. Provisional Application No. 62/180,722, filed on Jun. 17, 2015.

This application is related to U.S. Ser. No. 15/060,719, titled "SYSTEMS AND METHODS FOR INDICATING WHEN FRAMES EGRESS A PHY MODULE OF A NETWORK DEVICE", filed on Mar. 4, 2016.

The entire disclosures of the applications referenced above are incorporated herein by reference.

FIELD

The present disclosure relates to networks, and more particularly to timing controlled transfer of data from ports of data sources and bridges.

BACKGROUND

A data communication network may include multiple talkers (or sources of data) and multiple receivers. Any number of bridges may be connected in a daisy chain between each of the talkers and the receivers. The data communication network may be an arbitrary network (referred to as a non-engineered network) or non-arbitrary network (referred to as an engineered network). An arbitrary network may be, for example, a residential local area network (LAN), which may have different network devices (e.g., computers, cellular phones, televisions, printers, and electronic tablets) arbitrarily connecting and disconnecting at various points in the network and at random times. The network devices may connect and disconnect at any time regardless of the priority levels of data being transmitted in the arbitrary network. A non-arbitrary network may be, for example, an automotive network within a vehicle or a manufacturing assembly line network. In general, network devices in a non-arbitrary network are fixed and are not being connected and/or disconnected from the non-arbitrary network.

Network devices that are Institute of Electrical and Electronics Engineers (IEEE) 1588 standard (herein incorporated by reference in its entirety) compatible can support one-step or two-step clock precision time protocols (PTPs) to provide precise timing of transferred frames. During a data transfer event between two network devices operating according to the one-step clock PTP, a first network device may transmit an event message that includes a timestamp or other time information indicating when the event message is transmitted from the first network device to the second network device. In order for the event message to include the timestamp, a central processor of the first network device estimates a future time of day when the event message is to be transmitted from a port of a physical layer (PHY) of the first network device to the second network device. The estimated time is included in the event message when the event message is originally generated by the central processor. The estimated time can be inaccurate depending on delays associated with the PHY of the first network device. The central processor does not know an actual time that the event message is transmitted from the PHY of the first network device. As an alternative to estimating the future time of day, the central processor can build the event message and, prior to the PHY transmitting the event message to the second network device, the PHY can update time information in the event message to more accurately indicate the actual egress time of the event message. The one-step clock PTP refers to the transmission of the event message without transmission of a follow up message.

During a data transfer event between two network devices operating according to the two-step clock PTP, a PHY of a first network device may transmit an event message from an egress port of the first network device to the second network device. A timestamp (e.g., a binary counter value) of when the frame was transmitted to the second network device is determined by the PHY. The timestamp is stored in a register accessible by a central processor of the first network device. Once the frame egresses the egress port and the timestamp is generated, the central processor may receive an interrupt (a high overhead operation) from the PHY. The central processor can then read the register and obtain the timestamp. As an alternative, the central processor may poll the PHY to obtain the timestamp. The central processor then converts the timestamp to an actual time of day and generates a follow up message ('FollowUp frame') indicating the actual time of day that the event message was transmitted. The actual time of day determined by the central processor may be, for example, a 10 byte value that includes an upper 6 bytes representing an integer portion of a timestamp in seconds and a lower 4 bytes representing a fractional portion of the timestamp in nanoseconds. The FollowUp frame is then transmitted to the second network device. As an alternative, the FollowUp frame may be generated by the PHY. In order for the PHY to build the FollowUp frame, the PHY needs to store information included in the event message. This requires a large amount of gates in hardware and tends not to be feasible since PHYs are typically incapable of originating frames. The two-step clock PTP refers to the generation of the event message, and after determining the egress time of the event message, generation of the FollowUp frame.

Both the one-step clock PTP and the two-step clock PTP introduce a large amount of latency in a data path. The one-step clock PTP introduces latency in transmitting an event message from an egress port of a corresponding network device. Latency can be introduced when a central processor of the network device estimates a time when the event message is to be transmitted from the PHY. Latency can also be introduced by (i) delaying transmission of the event frame to allow the PHY to compute and convert a timestamp to a time of day, and (ii) modifying the event message to accurately indicate the time of day when the event message was transmitted. The two-step clock PTP introduces latency in transmitting a FollowUp message by having a PHY (i) store a timestamp in a register of when an event message was transmitted, and (ii) generate an interrupt indicating the timestamp has been stored. Latency is also introduced by having a central processor receive the interrupt and read the register (a slow operation). Latency can also be introduced when the central processor polls the PHY for the timestamp and the PHY transmits the timestamp to the central processor.

Also, both the one-step clock PTP and two-step clock PTP can exhibit increased latency if a large number of frames are stored in a queue to be egressed from a same egress port. For the one-step clock PTP, the central processor needs to be informed of (i) the number of frames stored in the queue, (ii) a delay until a particular event frame is to be transmitted, and/or (iii) a time when the event frame is to be transmitted. For a two-step clock PTP, the more frames stored in the queue, the more delayed a central processor may be in determining an egress time of an event frame, depending on where in the queue the event frame is stored.

SUMMARY

A network device is provided and includes a port. The port includes a register module and a timing module. The register module includes a first one or more time of day registers, a loadpoint register and a compensation register. The timing module includes a second one or more time of day registers and a time of day module. The register module receives a first time of day from a control module. The control module is separate from the network device. The first time of day is a future time and is based on a grandmaster clock signal. The first one or more time of day registers store the first time of day. The loadpoint register stores an initial hardware time. The control module selects the initial hardware time. The compensation register stores a compensation value received from the control module. The compensation value is determined based on a difference between a local clock signal and the grandmaster clock signal. The timing module operates based on the local clock signal. The time of day module, when a local hardware time of the timing module matches the initial hardware time, (i) transfers the first time of day from the first one or more time of day registers to the second one or more time of day registers, (ii) begins updating the first time of day stored in the second one or more time of day registers based on the local clock signal, and (iii) updates the first time of day based on the compensation value.

In other features, a method of operating a network device is provided. The network device includes a first port. The first port includes a register module and a timing module. The register module includes a first one or more time of day registers and a loadpoint register. The timing module includes a second one or more time of day registers and a time of day module. The method includes: receiving a first time of day from a control module at the register module, where the control module is separate from the network device, where the first time of day is a future time and is based on a grandmaster clock signal; storing the first time of day in the first one or more time of day registers; storing an initial hardware time in the loadpoint register, where the control module selects the initial hardware time; and storing a compensation value received from the control module in a compensation register, where the compensation value is determined based on a difference between a local clock signal and the grandmaster clock signal. The method further includes: operating the timing module based on the local clock signal; and when a local hardware time of the timing module matches the initial hardware time, (i) transferring the first time of day from the first one or more time of day registers to the second one or more time of day registers, (ii) begin updating the first time of day stored in the second one or more time of day registers based on the local clock signal, and (iii) updating the first time of day based on the compensation value.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
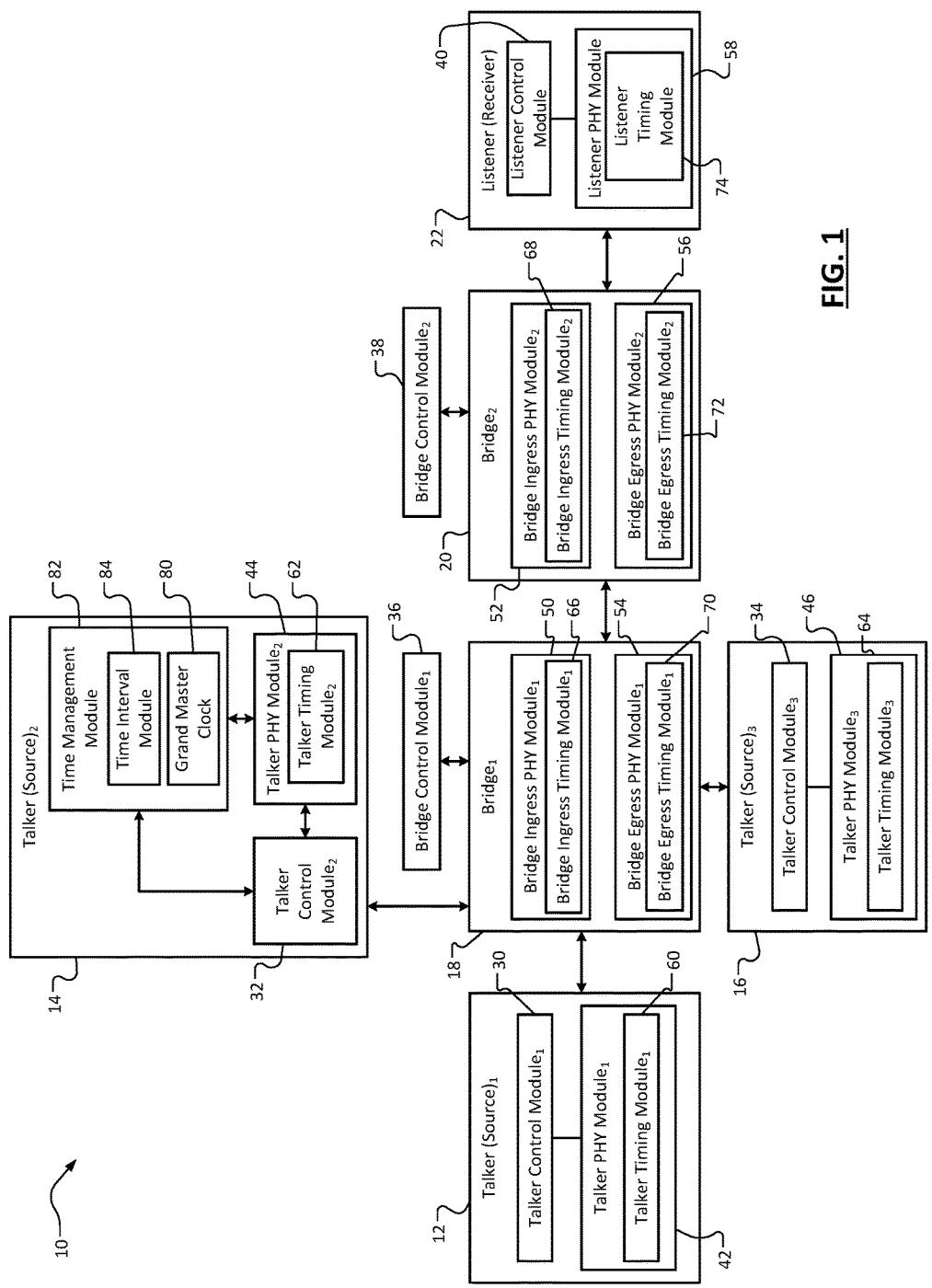
FIG. 1 is a functional block diagram of an example of a network incorporating network devices performing PTPs in accordance with the present disclosure.

A one-step clock PTP can be used to eliminate some central processing overhead, but can require that the central processor predict an actual egress time of an event message prior to the event message being generated. The central processor builds the event message (or event frame) based on the predicted egress time. To assure that the predicted time is accurate, the central processor needs to communicate with a PHY of the network device to make sure that the event frame actually leaves the network device at the predicted time. This introduces a significant amount of latency in a data path of the event frame. A two-step clock PTP implementation can also introduce latency and require a large amount of central processing overhead to gather time information for transmission of an event frame. Some of the latency and central processing overhead is due to a central processor waiting for an interrupt indicating that an event frame has been transmitted before generating a follow up ('FollowUp') message; receiving the interrupt; and ceasing to perform and/or postponing one or more tasks to provide time to read a register for an egress time of the event frame and generate the FollowUp message.

Time-aware network devices periodically handle synchronization messages while implementing a PTP to determine accurate egress times of frames. The synchronization messages (or frames) are sent to synchronize operations of the network devices. Operating efficiency is negatively affected each time a central processor services a synchronization message due to (i) idle processing cycles of the central processor waiting for an interrupt or a timestamp, and/or (ii) non-idle processing cycles in which the processor is accessing, calculating, estimating and/or predicting an egress time and generating a corresponding FollowUp message (or FollowUp frame).

Subsequent to a central processor generating an event frame (e.g., synchronization (sync) frame), most of the information needed to generate a corresponding FollowUp frame is readily available to the central processor. An egress time is not, however, readily available to the central processor upon generation of the event frame. As a result, the central processor waits until an egress timestamp of the event frame is available before building the FollowUp frame. To eliminate the waiting and generating of the FollowUp frame by the central processor, the PHY may generate the FollowUp frame. This approach, however, poses an issue of increased gate count, complexity and latency in the data path.

Example systems and methods are disclosed below that include a control module and/or a central processor of a network device generating a FollowUp frame while and/or subsequent to generating a sync frame without waiting for an egress timestamp or an egress time of day of the sync frame. Instead of waiting for an interrupt indicating that the sync frame has been transmitted from the network device, the FollowUp frame is generated based on the information readily available to the control module. A PHY module of the network device updates the FollowUp frame to include an accurate egress time of the sync frame prior to the PHY module transmitting the FollowUp frame. This allows the FollowUp frame to be sent subsequent to the sync frame in a back-to-back (or one after another) format with minimal to no delay between transmission of the sync frame and the FollowUp frame. This is especially advantageous for PHY modules operating in a one byte in/one byte out manner (i.e. as a byte is received at a PHY module another byte received earlier by the PHY module is transmitted from the PHY module).

Another cause of delay is due to a central processor waiting to convert and converting a timestamp (or local time format) of an egress time of an event frame to an actual time of day that is based off of a global (or grandmaster) clock. IEEE 1588 compatible network devices may operate according to a one-step clock PTP or a two-step clock PTP. While operating according to the one-step clock PTP, a central processor of the network device predicts an egress timestamp of an event frame and may then convert the egress timestamp to a time of day based on a time indicated by the grandmaster clock. While operating according to the two-step clock PTP, the central processor may generate an event message. A PHY of the network device may then generate a timestamp when the event message is transmitted. The central processor may (i) receive the timestamp, (ii) convert the time-stamp to a time of day, and then (iii) generate a FollowUp message that includes the time of day.

In a network device operating according to a one-step clock PTP or a two-step clock PTP, a central processor typically maintains an updated and accurate time of day and a PHY typically maintains a binary counter to timestamp egress frames. In a network device operating according to a two-step PTP, a central processor converts a binary timestamp value of the binary counter to a time of day and includes the time of day in a generated FollowUp frame. Between sending the event frame and generating the FollowUp frame, the central processor has to spend idle cycles waiting to receive and/or access the binary timestamp value to create the FollowUp message.

In a network device operating according to a one-step clock PTP or a two-step clock PTP, a PHY may modify frames (event frames or FollowUp frames) prior to transmitting updated timestamp information or other time related information in the frames. This can require that the PHY have knowledge of an actual time of day value at each egress timestamp instance. In order to obtain the actual time of day, the PHY needs to request time of day information from the central processor each time a frame is received by the PHY or sent out from the PHY. This defeats a goal of offloading processing tasks performed by the central processor.

Example systems and methods disclosed below include PHY modules offloading control modules and/or central processors by updating FollowUp messages with time of day values indicating actual egress times when event frames were transmitted. The PHY modules maintain time of day values and are capable of updating the FollowUp messages without receiving a time of day value from a control module and/or central processor.

FIG. 1 shows a network 10 including network devices operating according to PTPs. As shown, the network devices include one or more talkers (three talkers 12, 14, 16 are shown), one or more bridges (two bridges 18, 20 are shown) and a listener 22. The bridges 18, 20 may be implemented as switches, routers, or other intermediary network devices. The talkers 12, 14, 16 may be referred to as sources, since the talkers 12, 14 transmit data to the listener 22. The listener 22 may be referred to as a receiver, since the listener 22 receives data from the talkers 12, 14, 16. The talkers 12, 14, 16, bridges 18, 20 and listener 22 may include and/or be coupled to respective control modules 30, 32, 34, 36, 38, 40. The talkers 12, 14, 16 may include respective PHY modules 42, 44, 46. The bridges 18, 20 may include ingress PHY modules 50, 52 and egress PHY modules 54, 56. The PHY modules 50, 54 may be implemented as a single PHY module. Similarly, the PHY modules 52, 56 may be implemented as a single PHY module. The listener 22 has a PHY module 58. The bridges 18, 20 may conform to the IEEE 802.1 AS standard, which provides precise timing protocols (PTPs). The talkers 12, 14, 16, bridges 18, 20 and the listener 22 may conform to the IEEE 1588 standard, the IEEEE 802.1AS standard and/or the IEEE 1722 standard. The bridges 18, 20 provide a daisy chain of network devices between end stations (e.g., the talkers 12, 14, 16 and the listener 22). Each of the PHY modules 42, 44, 46, 50, 52, 54, 56, 58 may include respective timing modules 60, 62, 64, 66, 68, 70, 72, 74.

Figure 2:
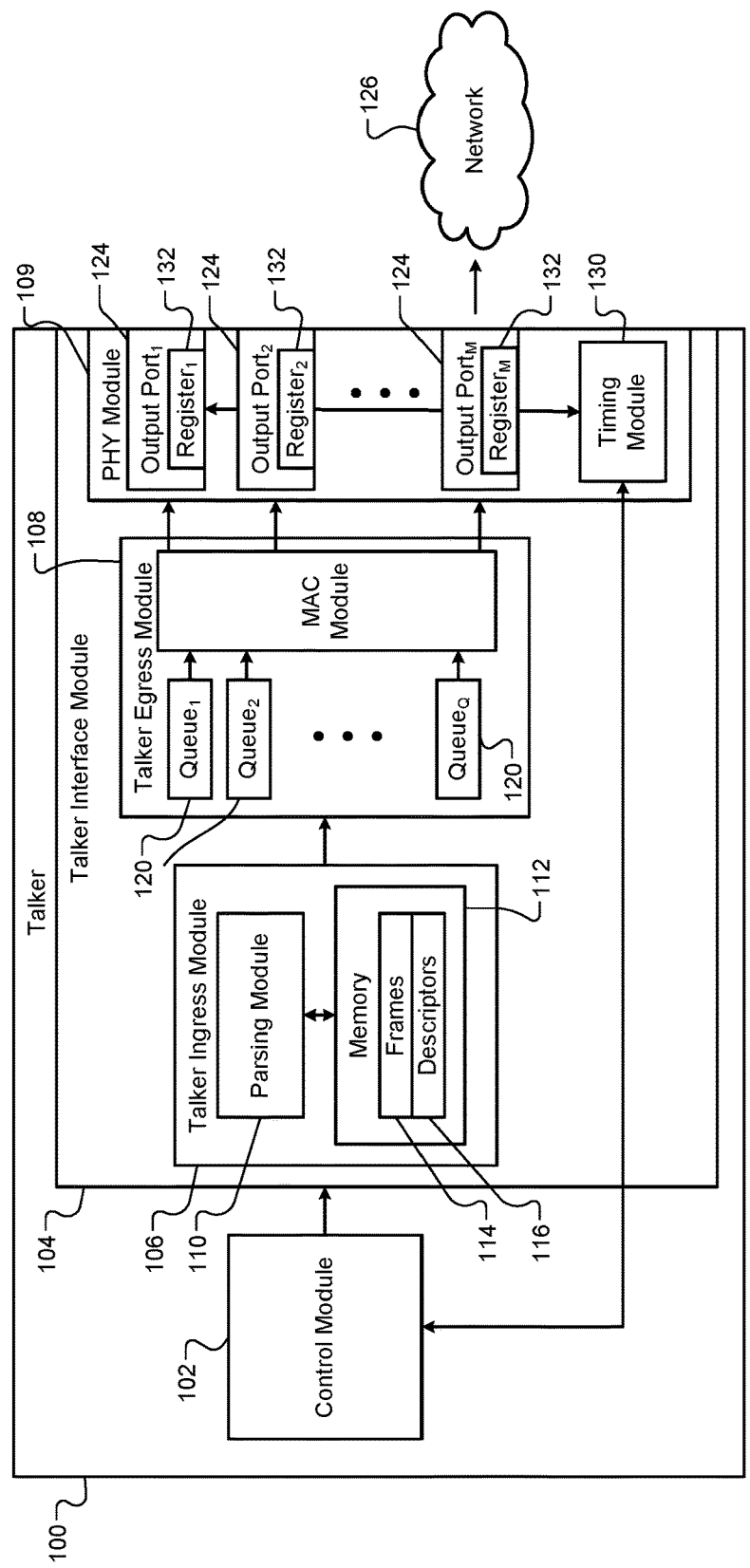
FIG. 2 is a functional block diagram of an example of a talker in accordance with an embodiment of the present disclosure.
Figure 3:
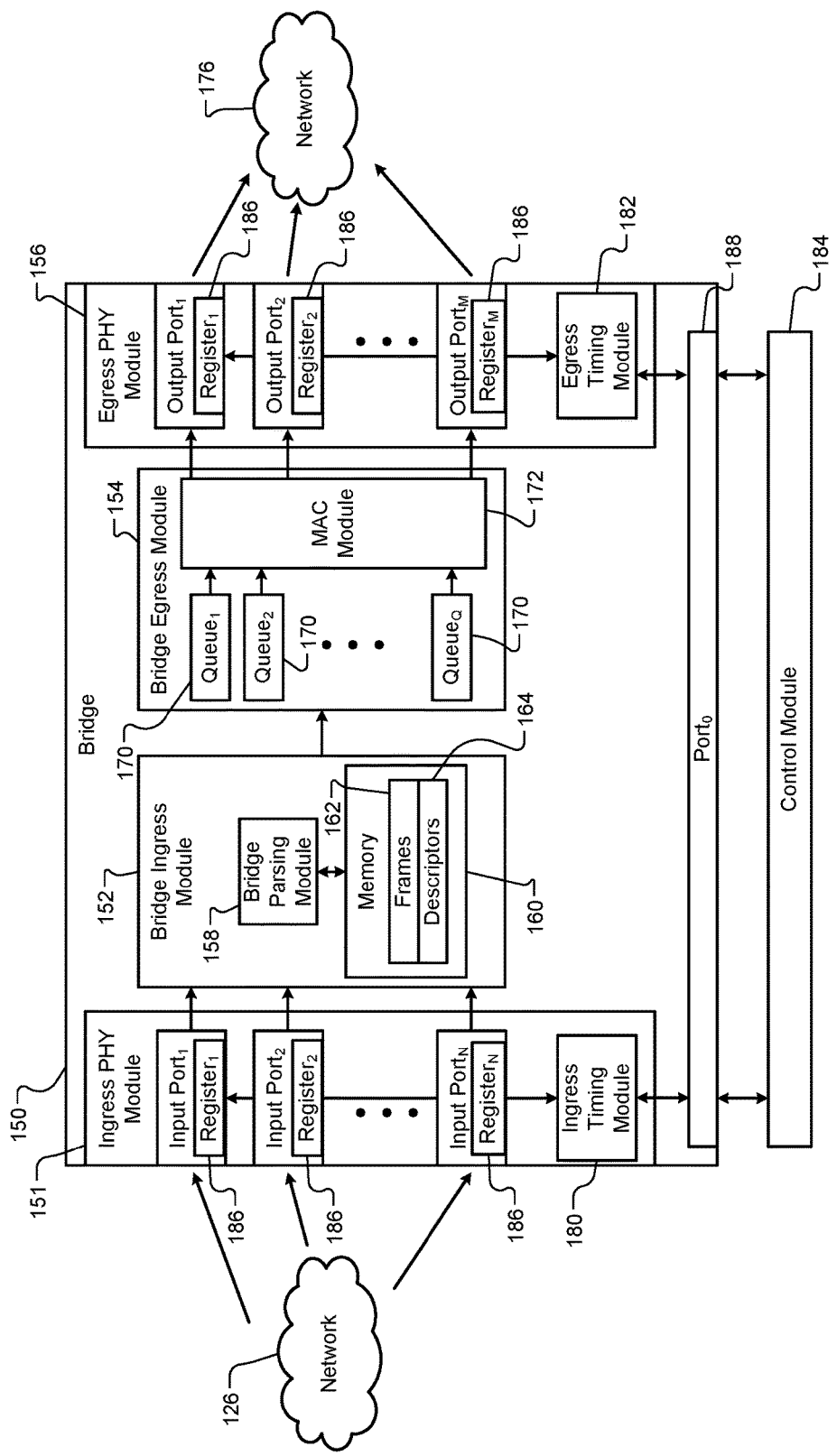
FIG. 3 is a functional block diagram of an example of a bridge in accordance with an embodiment of the present disclosure.
Figure 4:
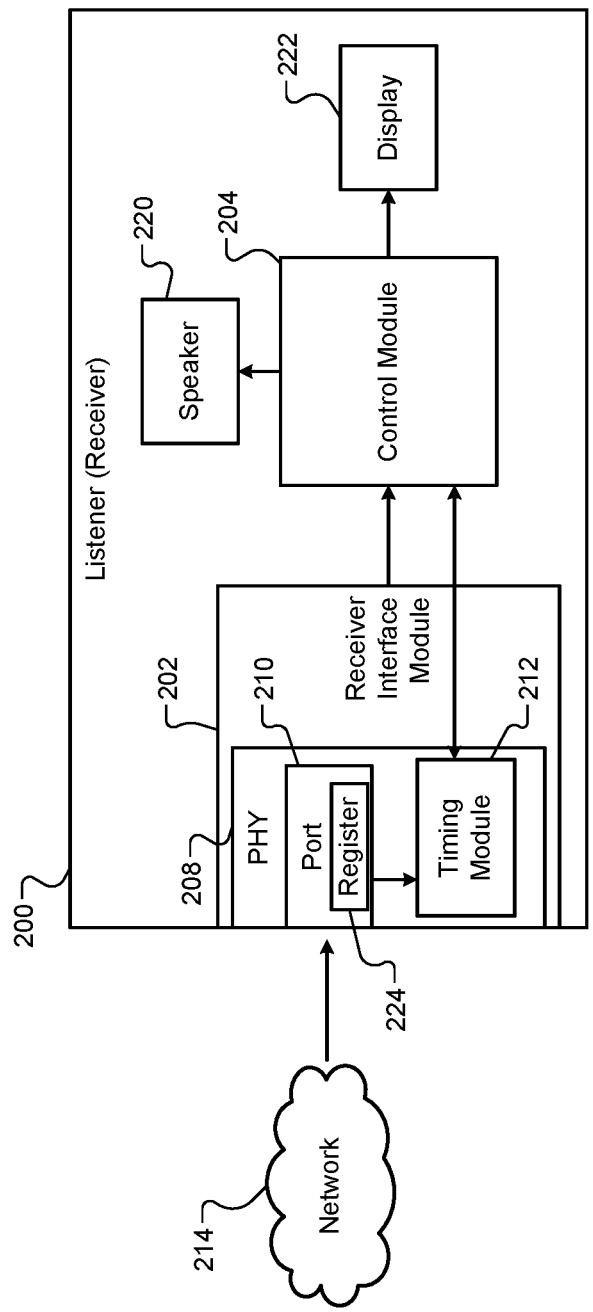
FIG. 4 is a functional block diagram of an example of a listener in accordance with an embodiment of the present disclosure.

Ingress modules and/or egress modules of the talkers 12, 14, 16, bridges 18, 20 and listener 22 (examples of which are shown in FIGS. 2-4) may operate based on a global clock signal generated by a grand master clock 80. The grand master clock 80 may be located in any of the network devices of the network 10. The global clock signal may be shared with any of the network devices in the network 10. As an example, the grand master clock 80 is shown in the second talker 14, but may be located in one of the other talkers 12, 16, one of the bridges 18, 20, the listener 22, or other network device connected to the network 10.

The network device that includes the grand master clock 80 may include a time management module 82. As an alternative, one of the other network devices in the network 10 may include the time management module 82. The time management module 82 and/or the network device having the grand master clock 200 may be referred to as a master device. The time management module 82 and/or the network devices not having the grand master clock 80 may be referred to as slave devices. The time management module 82 may include the grand master clock 80 and/or a time interval module 84. The time interval module 84 may set a duration of a periodic transmission time interval and start times $t_0$ of each of the periodic transmission time intervals. The global clock signal, the periodic transmission time interval and the start time's $t_0$ of the periodic transmission time intervals may be shared between the network devices using a management information base (MIB) modules and/or a simple management network protocols (SMNPs).

The listener 22 receives data from the talkers 12, 14, 16 via the bridges 18, 20. The listener control module 40 may operate and/or monitor or operate one or more sensors, motors, actuators, or other devices of the network based on the data received from the talkers 12, 14, 16. The listener 22 may playout received audio frames on a speaker.

The talkers 12, 14, 16, bridges 18, 20, and/or listener 22 may communicate with each other via wired or wireless connections and/or mediums. The wireless connections and/or mediums may satisfy, for example, IEEE standards 802.11, 802.11a, 802.11b, 802.11g, 802.11h, 802.11n, 802.16, and/or 802.20.

FIG. 2 shows a talker 100, which is an example of one of the talkers 12, 14, 16 of the network 10 of FIG. 1. The talker 100 includes a control module 102 and an interface module 104. The control module 102 may include, for example, a processor and provide data of different priority levels to the interface module 104. The data may include Class A data, Class B data, and non-AVB data. Class A data may include audio video bridging (AVB) data with a highest priority level. Although AVB data may include audio data and/or video data, AVB data may also include control data, user data, reference data, or other types of data. The highest priority level data may be provided with a predetermined amount of bandwidth and a predetermined maximum latency. This assures that the Class A data is transmitted during allocated time periods and latency associated with transmitting the Class A data over a predetermined number of hop(s) and/or between end stations is less than the predetermined maximum latency. Class B data may be AVB data with a next highest priority level. Non-AVB data may have a lowest priority level. In general, higher priority data is transmitted before lower priority data. The interface module 104 may be, for example, a network interface card or other suitable interface. The interface module 104 includes a talker ingress module 106, a talker egress module 108, and a PHY module 109.

The talker ingress module 106 may, include, for example, a talker parsing module 110 and a first memory 112. The talker parsing module 110 may receive frames 114 of data from the control module 102, parse the frames 114, and generate descriptors 116 based on headers provided in frames 114. Each of the headers and/or descriptors 116 may include a size of a corresponding frame, a start time of a periodic transmission time interval, a length of the periodic transmission time interval, source addresses, and/or destination addresses. The frames 114 and the descriptors 116 may be stored in the talker memory 112 and be provided in a descriptor signal to the talker egress module 108.

The talker ingress module 106 may receive from the control module 102 various types of frames including sync frames, FollowUp frames, peer delay request ('PdelayReq') frames, peer delay response ('PdelayResp') frames, peer delay response follow up ('PdelayRespFollowUp') frames, etc. These frames are used by network devices to determine accurate ingress and egress times of frames, as further described below.

The talker egress module 108 includes queues 120 and a medium access control (MAC) module 122. Frames are received and stored in the queues 120, forwarded to the MAC module 122 and then provided to corresponding output ports 124 of the PHY module 109. The frames may be transmitted to a network 126. The talker egress module 108 may transmit received frames based on priority levels of the frames and/or based on statuses of the queues 120. The frames may also be transmitted based on the order in which the frames are received.

Figure 16:
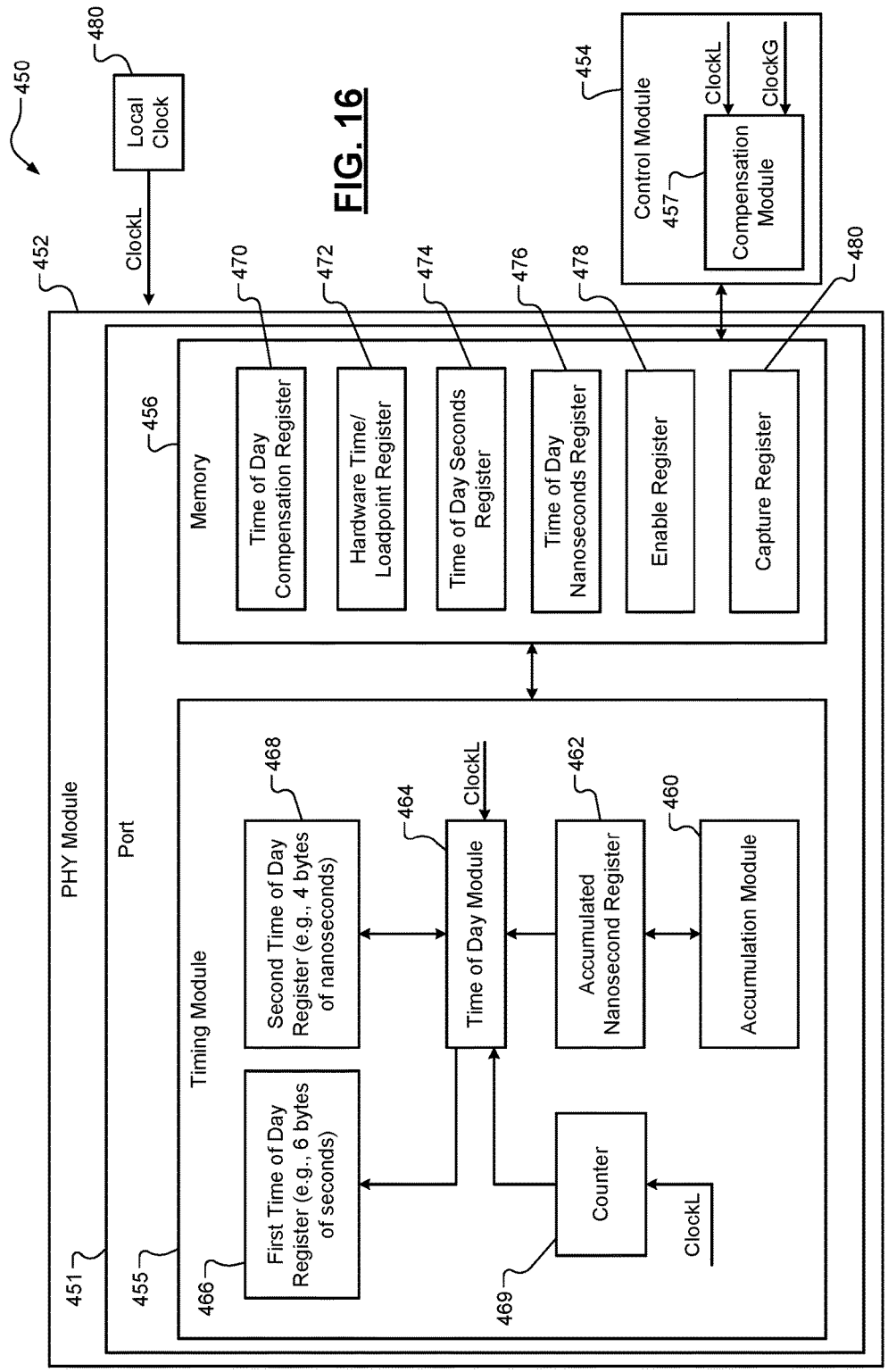
FIG. 16 is a functional block diagram of an example portion of a system of network device illustrating time of day determination and maintenance in a port of a PHY module and in accordance with an embodiment of the present disclosure.

The PHY module 109 may include a timing module 130. Although shown in the PHY module 109, the timing module 130 may be in one of the output ports 132, one of the modules 106, 108, or elsewhere in the talker 100 and is not in the control module 102. The timing module 130 may operate based on a local clock and may be in communication with the control module 102 and have access to registers 132 in the ports 124. An example of the local clock is shown in FIGS. 16 and 18. The registers 132 may each be used to store a current time of day in one or more formats. The current time of day may be initially and/or periodically determined by the timing module 130 and maintained by the ports 124 and/or time of day modules of the ports 124, as is further described below. The control module 102 may access the timing module 130 and/or the registers 132 to determine whether the current times of day stored in the one or more formats in the ports 124 and/or a current time of day stored in the timing module 130 match a current time of day (e.g., a grandmaster time of day) determined by the control module 102. The control module 102 may generate compensation values to modify the current times of day of the ports 124 and the timing module 130 based on one or more of the determinations. This is further described below with respect to the embodiments of FIGS. 16-19.

FIG. 3 shows a bridge 150, which is an example of one of the bridges 18, 20 of FIG. 1. The bridge 150 includes an ingress PHY module 151 with input ports$_{1-N}$, a bridge ingress module 152, a bridge egress module 154 and an egress PHY module 156 with output ports$_{1-M}$. Although a single bridge ingress module and a single bridge egress module are shown, the bridge 150 may include any number of bridge ingress modules and bridge egress modules. The bridge ingress modules may be connected to the same input ports and/or to different input ports. The bridge egress modules may be connected to the same output ports and/or to different output ports. Each of the bridge ingress modules may be connected to and/or communicate with one or more of the bridge egress modules. Although the ports N, M are labeled as input ports and output ports, each of the ports N, M may perform as an input port and/or an output port. Also, each of the ports N, M may be connected to the bridge ingress module 152 and/or the bridge egress module 154. In addition, the bridge 150 may include any number of input ports and output ports. Although two PHY modules 151, 156 are shown, the PHY modules 151, 156 may be implemented as a single PHY module.

The bridge ingress module 152 includes a parsing module 158 and a first memory 160. The bridge parsing module 158 may receive data from a talker, a bridge, and/or a time translator device directly or via the network 126. The bridge parsing module 158 may parse frames 162 received and generate descriptors 164 based on headers provided in the frames 162. Each of the descriptors 164 may include a size of a corresponding frame, a start time of a periodic transmission time interval, a length of the periodic transmission time interval, and/or source and/or destination addresses. The frames 162 may include sync frames, FollowUp frames, peer delay request ('PdelayReq') frames, peer delay response ('PdelayResp') frames, peer delay response follow up ('PdelayRespFollowUp') frames, etc. The frames 162 and descriptors 164 may be stored in the first memory 160 and provided in a descriptor signal to the bridge egress module 154.

The bridge egress module 154 includes queues 170 and a MAC module 172. Frames are received and stored in the queues 170, forwarded to the MAC module 172 and then provided to corresponding ones of the output ports$_{1-M}$. The frames may be transmitted to another bridge or a listener directly or via a network 176. The network 176 may be the same network as the network 126. The bridge egress module 154 may transmit received frames based on priority levels of the frames and/or based on statuses of the queues 170. The frames may also be transmitted based on the order in which the frames are received.

The ingress PHY module 151 may include an ingress timing module 180. The egress PHY module 156 may include an egress timing module 182. Although shown in the PHY modules 151, 156 the timing modules 181, 182 may be in one of the input ports, one of the output ports, one of the modules 152, 154, or elsewhere in the bridge 150 and is not in the control module 184. Although two timing modules are shown, a single timing module may be included for both the input ports and the output ports. The timing modules 180, 182 may operate based on one or more local clocks and may be in communication with a control module 184 and have access to registers 186 in the input ports and the output ports. An example of a local clock is shown in FIGS. 16 and 18. The control module 184 may be separate from the bridge 150 and accessed via a port 188. The control module 184 may be located within a host device that is separate from the bridge 150. The registers 186 may each be used to store a current time of day in one or more formats. The current time of day may be initially determined and/or periodically reset by one or more of the timing modules 180, 182 and/or accessed by and/or shared with the other one of the timing modules 180, 182. The control module 184 may access the registers 186 and/or be provided with the current times of day by one or more of the timing modules 180, 182. The control module 184 may then determine whether the current times of day stored in the one or more formats in the input ports and the output ports and/or current times of day stored in the timing modules 180, 182 match a current time of day (e.g., a grandmaster time of day) determined by the control module 184. The control module 184 may generate compensation values to modify the current times of day of the input ports, the output ports and the timing module 180, 182 based on one or more of the determinations. This is further described below with respect to the embodiments of FIGS. 16-19.

FIG. 4 shows a listener 200, which is an example of the listener 22 of FIG. 1. The listener 200 may include a receiver interface module 202, a control module 204, and a memory 206. The listener 200 may include a PHY module 208 that includes one or more ports (a single port 210 is shown) and a timing module 212. Although shown in the PHY module 208, the timing module 212 may be in the port 210, the receiver interface module 202, or elsewhere in the listener 200 and is not in the control module 204. The port 210 may receive frames from a talker or a bridge directly or via the network 176. The frames are forwarded to the control module 204 and may be played out on a speaker 220 and/or displayed a display 222.

The timing module 212 may operate based on a local clock and may be in communication with the control module 204 and have access to a register 224 in the port 210. An example of the local clock is shown in FIGS. 16 and 18. The register 224 may be used to store a current time of day in one or more formats. The current time of day may be initially determined by and/or periodically reset by the timing module 212. The control module 204 may access the register 224 and/or be provided with the current time of day in the register 224 by the timing module 212. The control module 204 may then determine whether the current times of day stored in the one or more formats and/or a current time of day determined by the timing module 212 matches a current time of day (e.g., a grandmaster time of day) determined by the control module 204. The control module 204 may generate a compensation value to modify the current times of day of port 210 and the timing module 212 based on one or more of the determinations. This is further described below with respect to the embodiments of FIGS. 16-19. Although FIGS. 2 and 4 show network devices 100 and 200 configured to operate respectively as a talker and a listener, each of the network devices 100, 200 may be configured to operate as both a talker and a listener.

Figure 5:
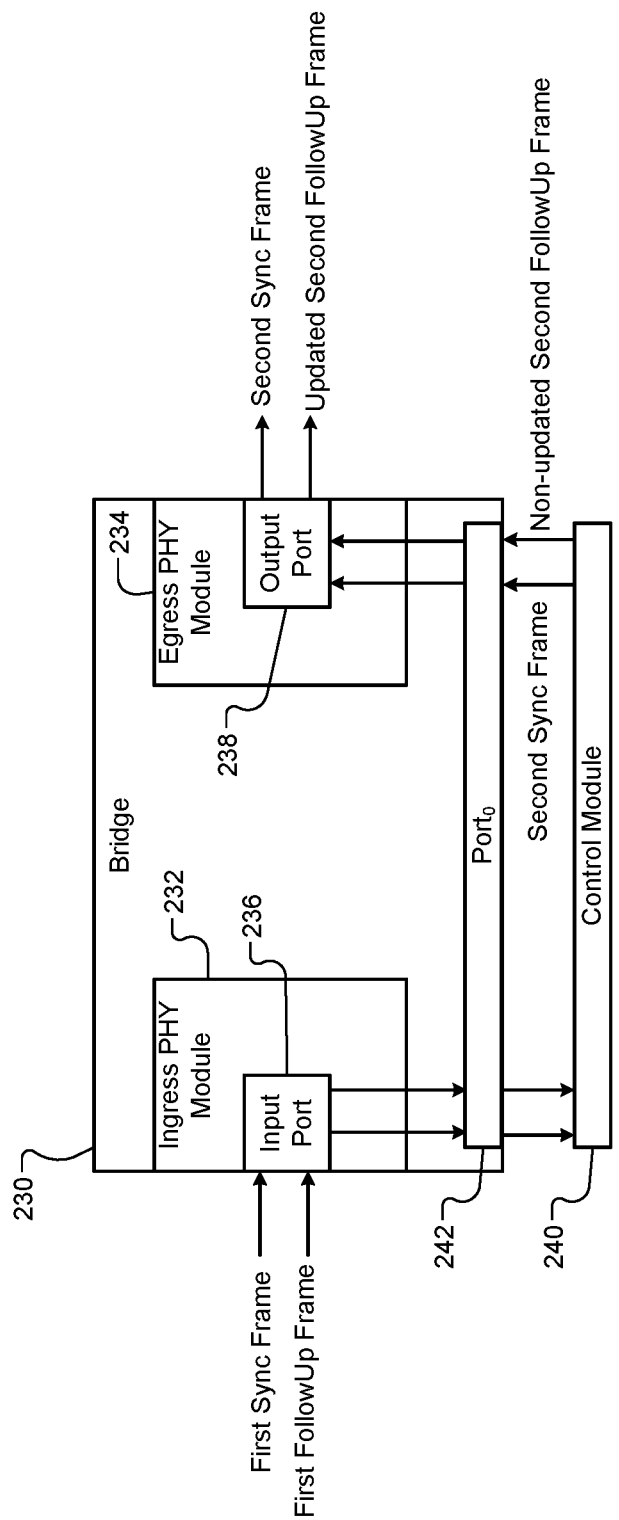
FIG. 5 is a functional block diagram of an example of a bridge implementing a first clock PTP in accordance with an embodiment of the present disclosure.

FIG. 5 shows a bridge 230 implementing a first clock PTP. The bridge 230 may be implemented as one of the bridges 18, 20, 150 of FIGS. 1 and 3. The bridge 230 may include an ingress PHY module 232 and an egress PHY module 234. The ingress PHY module 232 may include one or more input ports (one input port 236 is shown). The egress PHY module 234 may include one or more output ports (one output port 238 is shown). The bridge 230 may also include a control module 240 or the control module may be separate from the bridge 230 and accessed via a port 242 (referred to as a "control port"), as shown.

For further defined structure of the modules of FIGS. 1-5 see below provided methods of FIGS. 6, 11, 17 and 19 and below provided definition for the term "module". The PTP systems disclosed herein may be operated using numerous methods, example methods are illustrated in FIGS. 6, 11, 17 and 19. Although the following methods are shown as separate methods, one or more methods and/or tasks from separate methods may be combined and performed as a single method.

Figure 6:
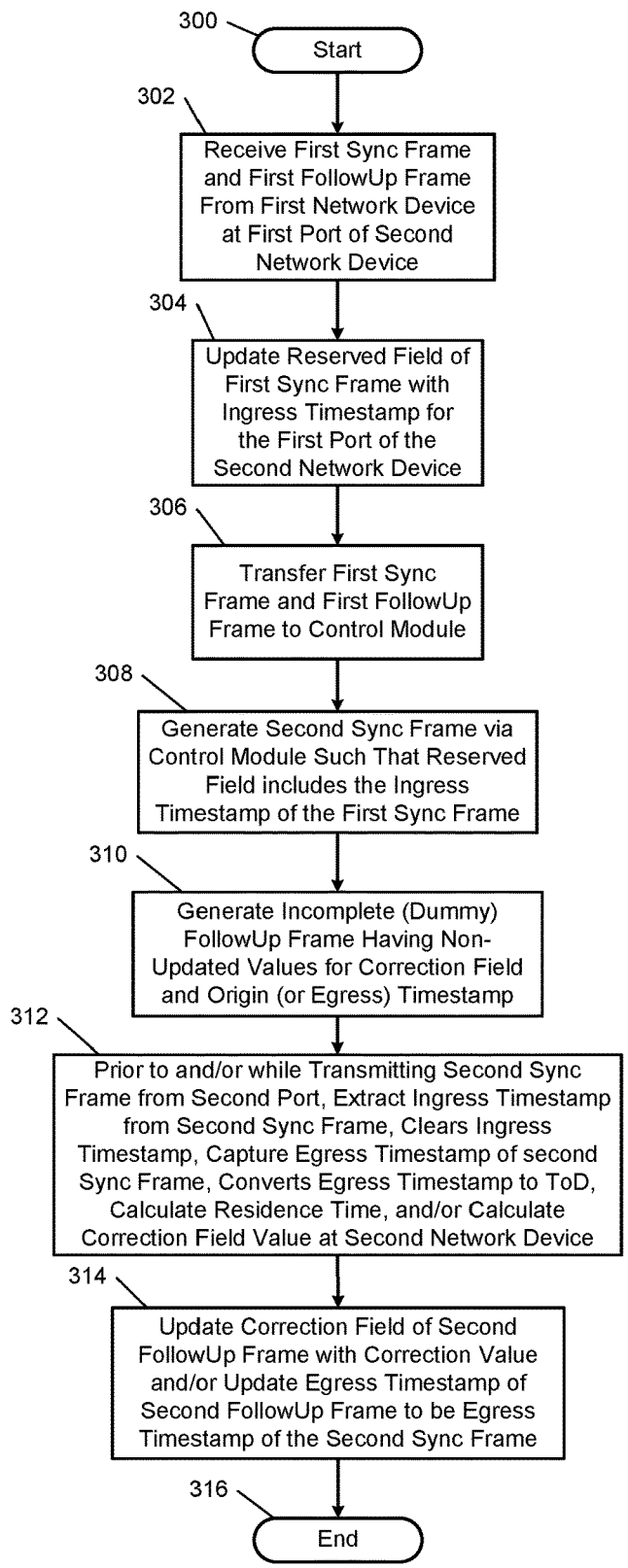
FIG. 6 illustrates an example of a first clock PTP method in accordance with an embodiment of the present disclosure.

In FIG. 6, a first clock PTP method is shown. Although the following tasks are primarily described with respect to the implementation of FIG. 5, the tasks may be easily modified to apply to other implementations of the present disclosure. The tasks may be iteratively performed. The method may begin at 300. At 302, a first sync frame and a first FollowUp frame may be received from a first network device at the input port 236 of the bridge 230 (second network device). The first FollowUp frame may be received subsequent to the first sync frame. A sync frame is an event frame that includes grandmaster time information. A FollowUp frame includes an adjustment factor (or correction field value) to account for various delays between when the sync frame is generated and/or transmitted and when the sync frame is received.

At 304, the ingress port 236 updates a reserved field of the first sync frame to include an ingress timestamp of the first sync frame prior to sending the first sync frame to the control module 240. At 306, the first sync frame and the first FollowUp frame are transferred to and terminated at the control module 240.

At 308, the control module 240 generates a second sync frame such that a reserved field of the second sync frame includes the ingress timestamp received in the first sync frame. The second sync frame is transferred to the output port 238 for transmission from the egress PHY module 234 to a third network device.

Figure 7:
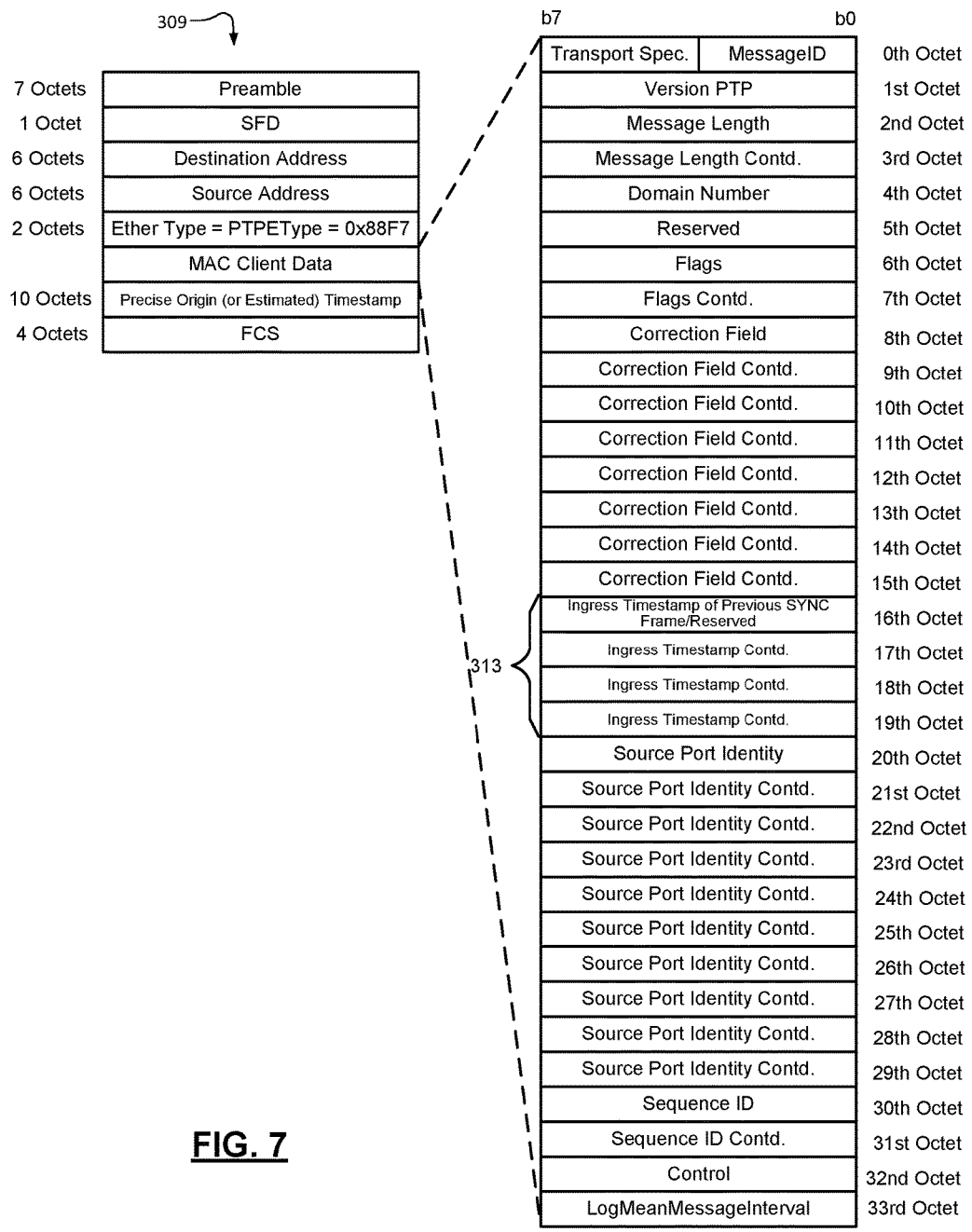
FIG. 7 is a view of an example of a sync message for the first clock PTP method of FIG. 6.
Figure 8:
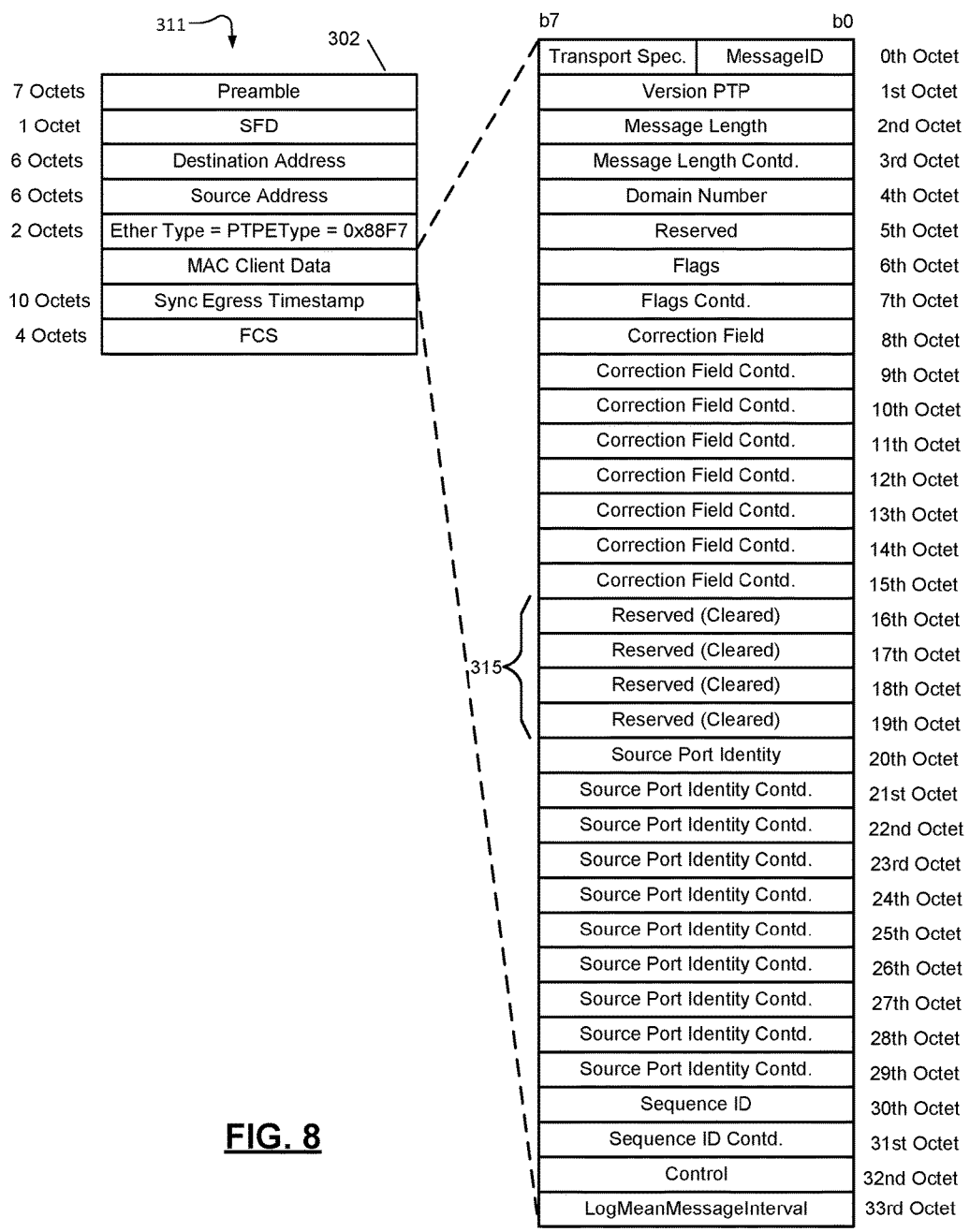
FIG. 8 is a view of an example of a FollowUp message for the first clock PTP method of FIG. 6 that satisfies a first IEEE standard.

At 310, the control module 240, while generating the second sync frame or subsequent to generating the second sync frame, generates an incomplete (or Dummy) FollowUp frame corresponding to the second sync frame. An example of a second sync frame 309 is shown in FIG. 7. An example of the FollowUp frame 311 subsequent to being modified at task 314 is shown in FIG. 8. The second sync frame 309 may represent a sync frame received at the egress port (or output port 238). The FollowUp frame 311 may represent a FollowUp frame out of an egress port (or the output port 238). Each of the second sync frame and the second FollowUp frame may include the following fields (listed as shown in FIGS. 7-8)—a preamble, a start frame delimiter (SFD), a destination address, a source address, an ether type (or PTP ether (PTPE) type), MAC client data, a timestamp, and a frame check sequence (FCS). While operating in the boundary clock mode, the timestamp of the sync frame 309 of FIG. 7 may be either an incoming frame's origin timestamp or an estimate of a current sync egress timestamp. While operating in the boundary clock mode, the timestamp of the FollowUp frame 311 of FIG. 8 may be a sync egress timestamp of the bridge 230 (second network device). While operating in one of the transparent modes, the timestamp of the FollowUp frame 311 of FIG. 8, may be a sync egress timestamp of the first network device. The MAC client data may include the following fields (listed as shown in FIGS. 7-8)—a transport specification value, a message identifier (ID), a PTP version value, a message length, a domain number, a first reserved field, a field containing flags, a correction field, a second reserved field, a source port identity, sequence ID, a control field, and a log mean message interval. As shown in FIG. 7, the second reserved field (identified 313) may include the ingress timestamp of the first sync frame. While operating in one of the transparent modes, the correction field of the FollowUp frame 311 may be set equal to a sum of an incoming value, a residence time, a mean path delay and an asymmetric ingress path delay.

For IEEE 1588 frames, the control module 240 has the information needed to generate the second FollowUp frame based on information included in the second sync frame except for an egress timestamp of the second sync frame. For this reason, the incomplete FollowUp frame includes information normally included in a FollowUp frame except a corrected timestamp of a time of day (ToD) value for an egress time of the second sync frame. For IEEE 802.1AS frames, two fields may not have corrected and/or updated values. The two fields are the timestamp field and the correction field, which may each be based on the egress timestamp of the second sync frame.

The one or more fields that do not have corrected and/or updated values may initially not be included or may initially include dummy and/or temporary values. The timestamp field may temporarily include an origin timestamp of when the second sync frame is generated and/or is to be transmitted (referred to as a predicted timestamp). The value placed in the timestamp field may be a ToD value generated based on a grandmaster clock and/or a local clock via a control module. The correction field may include an initial value, which for certain frames (e.g., IEEE 802.1AS FollowUp frames) may be later modified at task 314 by the output (or egress) port 238. The initial value may be generated according to a corresponding standard. The initial value of the correction field may be set based on: (i) a correction field value of a received frame (e.g., a correction field value of the first sync frame), (ii) a propagation delay, (iii) a mean path delay, and/or (iv) an asymmetric ingress path delay. The second FollowUp frame is transferred to the output port 238 for transmission from the egress PHY module 234 to the third network device.

At 312, the output port 238, prior to or while transmitting the second sync frame: extracts the ingress timestamp of the first sync frame from the second sync frame; clears the ingress timestamp from the second sync frame (i.e. sets the value of second reserved field 315 to a default value); captures an egress timestamp of second sync frame, converts the egress timestamp to a ToD; calculates a residence time; and/or calculates a correction field value. The conversion of the egress timestamp (e.g., a binary timestamp value) to the ToD may be performed based on one or more ToDs stored in one or more ToD registers. Examples of generating, storing, and maintaining ToDs in ToD registers of a timing module of a PHY module are described below with respect to FIGS. 16-19. The ToD associated with the egress timestamp of the second sync frame may be stored in a register of the timing module of the egress PHY module 234. The residence time may be calculated for IEEE 802.1AS frames and refers to a difference between the ingress time of the first sync frame and the egress time of the second sync frame. The residence time may not be calculated for IEEE 1588 frames. The correction field value may be calculated based on the residence time depending on the IEEE standard being applied. The residence time may be added to the initial value of the correction field by the output port 238.

Figure 9:
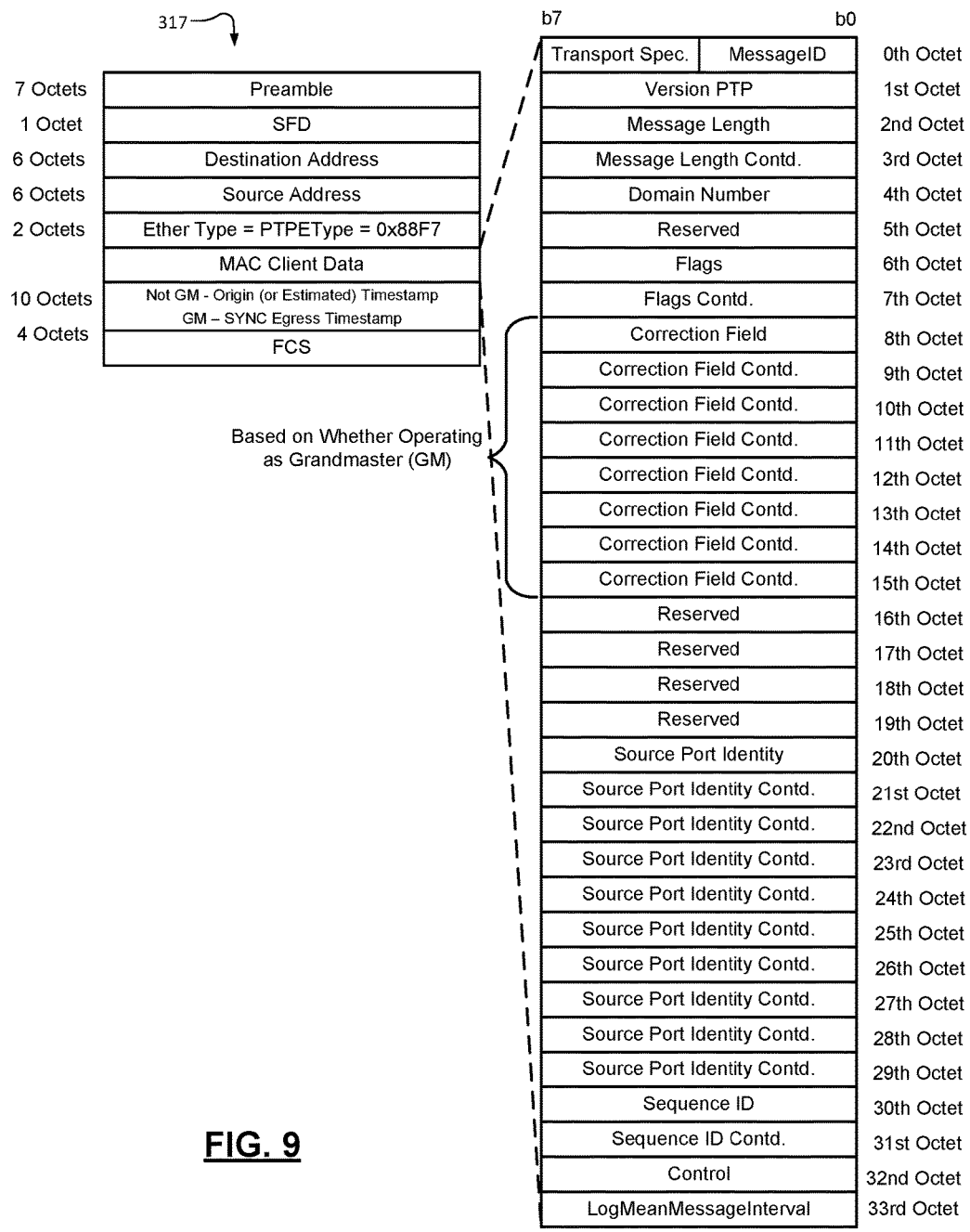
FIG. 9 is a view of another example of a follow up message for the first clock PTP method of FIG. 6 that satisfied a second IEEE standard.

At 314, the output port 238 may: update the correction field value of the second FollowUp frame based on the calculated correction field value and/or the residence time; and/or update the timestamp field of the second FollowUp frame to be the ToD associated with the egress timestamp of the second sync frame. An example of the updated second FollowUp frame is shown in FIG. 8. The format of the updated second FollowUp frame satisfies the IEEE 1588 standard. Another example of the updated second FollowUp frame 317 is shown in FIG. 9. The FollowUp frame of FIG. 9 may represent a FollowUp frame received at or out of an egress port (or the output port 238) depending on whether the second network device is operating as the grandmaster. The timestamp field may be either the origin (or estimated) timestamp if not operating as a grandmaster or may be a sync egress timestamp if operating as a gradmaster. The format of FIG. 9 satisfies the IEEE 802.1AS standard. As a result, the timestamp field and the correction field are handled differently depending on the IEEE standard being satisfied. The method may end at 316.

For IEEE 802.1AS frames, an egress time of a sync frame and a residence time of the sync frame are two fields that the control module 240 does not know upon generating the sync frame. During task 314, the output port 238 of the egress PHY module 234 sets the timestamp field of the second FollowUp frame to be the egress time (egress ToD) of the second sync frame if the network device 230 is the grandmaster. If the network device 230 is not the grandmaster, the output port 238 of the egress PHY module 234 does not modify the timestamp field, but rather the control module 240 sets the timestamp field equal to a timestamp field of a received frame (e.g., timestamp field of the first FollowUp frame) during task 310.

For IEEE 802.1AS frames and during task 314, the output port 238 of the egress PHY module 234 does not modify the correction field if the network device 230 is operating as a grandmaster. During task 310 and if the network device 230 is not operating as a grandmaster, the correction field may be set equal to a sum of: (i) a correction field value of a received frame (e.g., a correction field value of the first sync frame), (ii) a propagation delay, (iii) a mean path delay, and/or (iv) an asymmetric ingress path delay. The propagation delay may refer to a delay in transmission of a frame between network devices (e.g., between bridges). The mean path delay may refer to an average delay in sending frames between network devices. This asymmetric ingress path delay may refer to a difference between (i) a delay in sending a frame from a first network device to a second network device, and (ii) a delay in sending the frame from the second network device to the first network device. For IEEE 802.1AS frames and during task 314, the egress PHY module 234 does modify the correction field if the network device 230 is not operating as a grandmaster. The egress PHY module 234 may modify the correction field to be a sum of: (i) a correction field value of a received frame (e.g., a correction field value of the first sync frame), (ii) a residence time, (iii) a propagation delay, (iv) a mean path delay, and/or (v) an asymmetric ingress path delay. This may simply include the output port 238 adding the residence time to the correction field value set at 310.

The method of FIG. 6 includes a central process generating one or more event frames (e.g., sync frames) and sending the event frames out. While generating or subsequent to generating each of the event frames, the control module 240 also generates a corresponding general (or dummy) frame (e.g., FollowUp frame) with proper relevant information except for a timestamp field (or time related information) and/or a correction field. The dummy frame may be generated immediately after generation of the event frame and may be sent to a PHY module immediately after the event frame is sent to the PHY module. An output port of the PHY module detects when the event frame egresses the output port, captures a timestamp of the event frame, and converts the timestamp to a ToD (or an actual time based on the grandmaster clock that the frame egresses the output port). The dummy frame is updated with the ToD as the dummy frame egresses the output port and as a result has correct and accurate time information of when the event frame egressed the output port. This process is referred to as an "Auto FollowUp method" and eliminates need for the control module 240 to either (i) poll for an egress timestamp of the event frame, or (ii) service an interrupt indicating the egress timestamp is available. This reduces a large number of processing cycles of the control module 240. The control module 240 can create both an event frame and a corresponding dummy frame during a same time period and send them out and continue with other tasks. The PHY module then handles a remainder of the transmission process.

Output ports of PHY modules disclosed herein may perform two-step approaches and may experience a similar amount of overhead as a one-step approach previously described herein. Since the output port has at least a full frame time to compute a new timestamp (ToD) for an updated (or complete) FollowUp frame, less egress pipeline logic is needed, which reduce latency and allow gates to be used for other purposes. In addition, no frames are created in the PHY module. The output port of the PHY module updates dummy frames created by the control module 240. This allows pre-existing PHY modules to be easily modified to implement the stated method because the pre-existing PHY modules can continue to work at wire speed without a need for a memory to store frames. The modified PHY modules are able to satisfy a requirement of transmitting one byte out for every byte the PHY modules receive.

The bridges (or switches) disclosed herein are PTP aware network devices and support the Auto FollowUp method for both IEEE 1588 and IEEE 802.1AS PTP protocols. The PHY modules, timing modules and/or ports of the network devices may operate in different modes, such as an end-to-end transparent clock mode, a peer-to-peer transparent clock mode, a boundary clock mode and/or a ordinary clock mode. The end-to-end transparent clock mode refers to an output port of a PHY module determining a residence time. The peer-to-peer transparent clock mode refers to an output port of a PHY module determining a residence time and a transport time of a link between network devices.

The boundary clock mode refers to a first network device that operates one port as a slave port, which receives time from a master dock (upstream grandmaster dock of another network device). All other (or master) ports of the first network device are in a master state, which disseminate time to downstream slave devices. First sync messages are received in the slave port. A local dock is set based on time received at the slave port and second sync messages are generated based on the local dock. The second sync messages are sent out the other (or master) ports. The master ports are masters, but not grandmasters, since the master ports merely perform re-timing based on an upstream grandmaster or boundary dock. The examples of FIGS. 5-6 are examples of network devices operating in a boundary dock mode.

A user may program registers in a network device to indicate a selected operating mode (one of the above-described operating modes). A user may also program registers to indicate whether the network device is performing as a grandmaster (i.e. have a grandmaster clock) of the network. Once the configuration is done, ports of a PHY module of the network device perform appropriate frame modifications based on a message type (e.g., sync, FollowUp, etc.). The message type may be indicated as a MessageType field or a Message ID field in a received frame. To implement the Auto FollowUp method both an ingress port and an egress port of a network device may work together. When a frame enters the network device, the ingress port places a receive timestamp in the frame before passing the frame to a queue as applicable based on the operating mode. At the egress port, the timestamp embedded at the ingress port is extracted and certain fields are updated as applicable based on the operating mode. Different examples are shown in FIGS. 7-9 and are further shown in FIGS. 11-15. Thus, field modifications and/or updates performed during task 304 and 314 of FIG. 6 are based on the operating mode.

Figure 10:
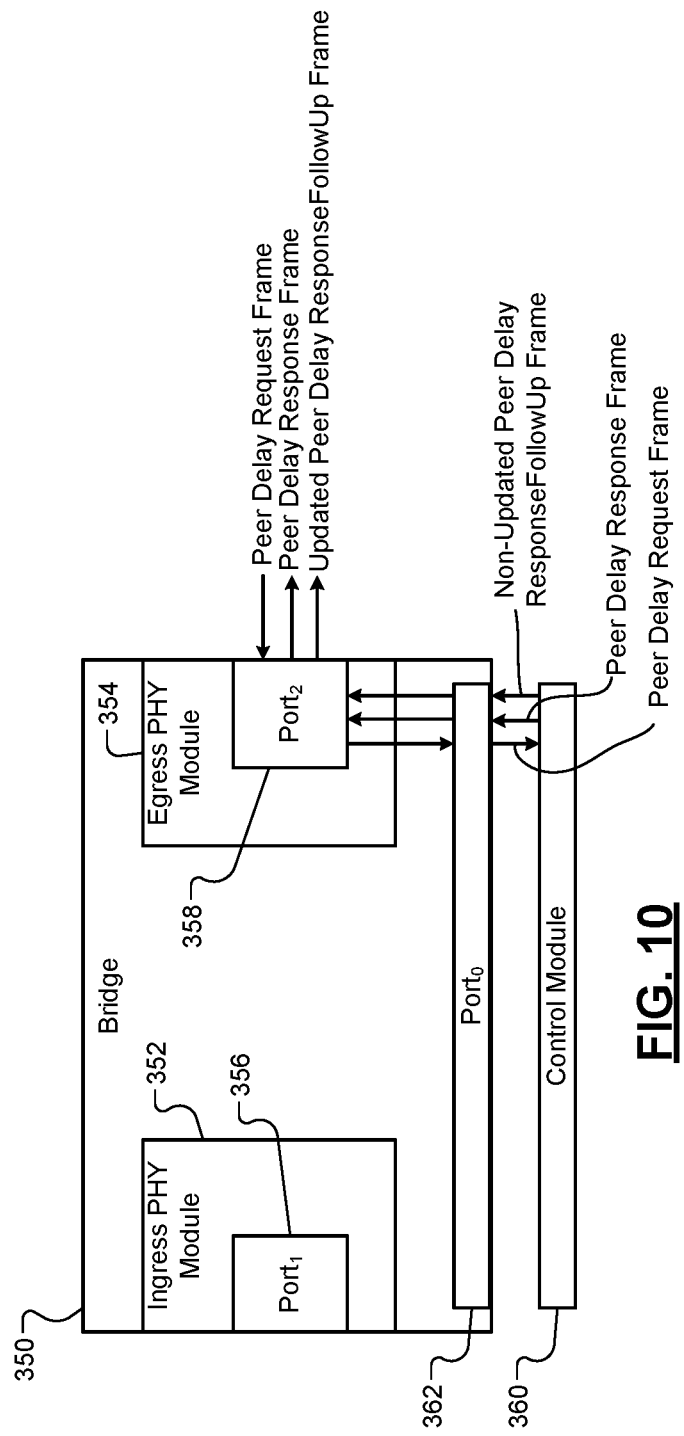
FIG. 10 is a functional block diagram of an example of a bridge implementing a second clock PTP in accordance with an embodiment of the present disclosure.

FIG. 10 shows a bridge 350 implementing a second clock PTP. The bridge 350 may be implemented as one of the bridges 18, 20, 150, 230 of FIGS. 1, 3 and 5. The bridge 350 may include an ingress PHY module 352 and an egress PHY module 354. The ingress PHY module 352 may include one or more ports (one port 356 is shown). The egress PHY module 354 may include one or more ports (one port 358 is shown). The bridge 350 may also include a control module 360 or the control module may be separate from the bridge 350 and accessed via a port 362 (referred to as a "control port"), as shown.

Figure 11:
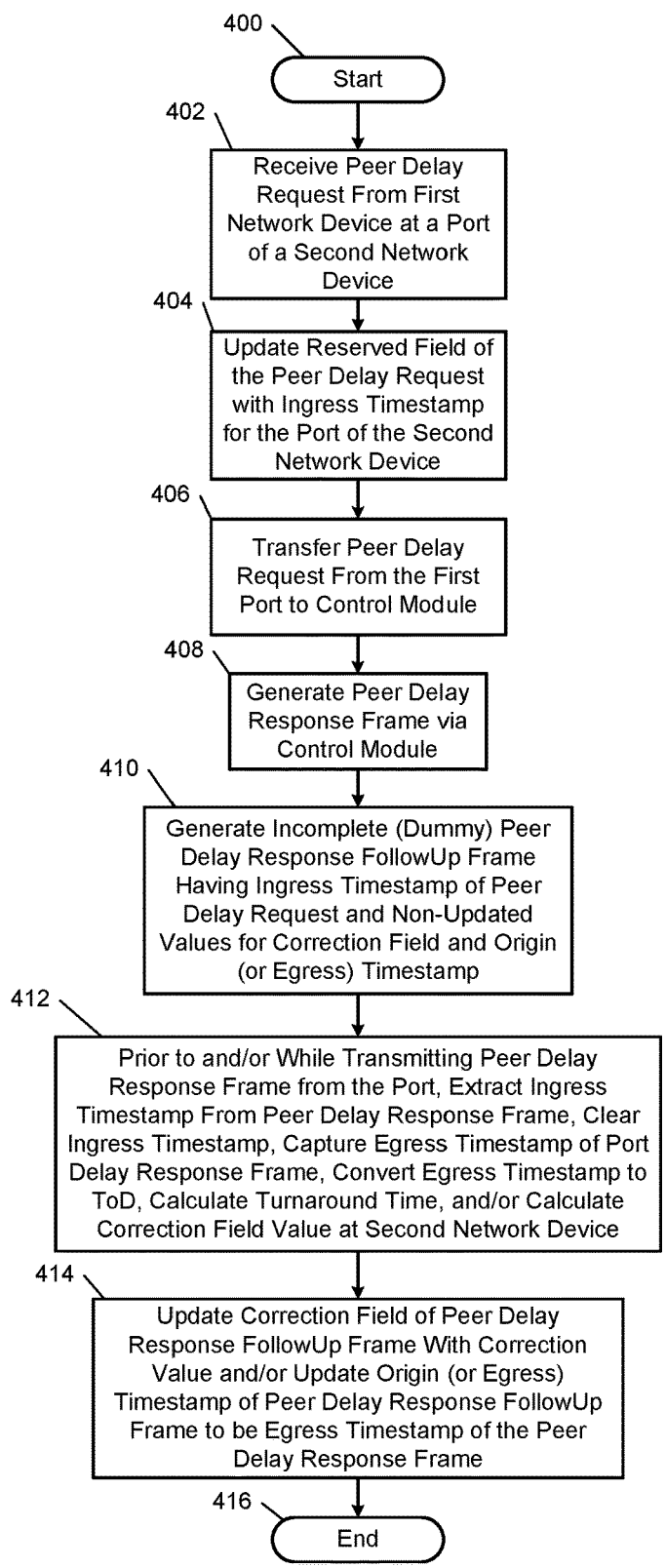
FIG. 11 illustrates an example of a second clock PTP method in accordance with an embodiment of the present disclosure.

FIG. 11 shows a second clock PTP method. Although the following tasks are primarily described with respect to the implementation of FIG. 10, the tasks may be easily modified to apply to other implementations of the present disclosure. The tasks may be iteratively performed. The method may begin at 400. At 402, a peer delay request (PdelayReq) frame is received from a first network device at the port 358 of a second network device 350. An ingress timestamp is generated by the port 358 when the PdelayReq frame is received at the port 358.

At 404, the port 358 updates and/or sets the second reserved field of the PdelayReq frame equal to the ingress timestamp of the PdelayReq frame. At 406, the PdelayReq frame is transferred to and terminated at the control module 360.

At 408, the control module 360 generates a peer delay response (PdelayResp) frame and forwards the PdelayResp frame to the port 358 for transmission from the egress PHY module 354 to the first network device. The timestamp field of the PdelayResp frame may be set to the ingress timestamp of the PdelayReq frame.

At 410, the control module 360 generates a peer delay response follow up (PdelayRespFollowUp) (or 'dummy') frame. The PdelayRespFollowUp frame may have initial dummy (or temporary) values for a timestamp field and a correction field, as described above with respect to task 310 of FIG. 6. The PdelayRespFollowUp frame is transferred to the port 358 for transmission from the egress PHY module 354 to the first network device. The PdelayRespFollowUp frame may be generated while, subsequent to and/or immediately after generation of the PdelayResp frame. The PdelayRespFollowUp frame may be transferred to the port 358 while, subsequent to and/or immediately after transferring the PdelayResp frame to the port 358. The initial value of the correction field may be set based on: (i) a correction field value of a received frame (e.g., a correction field value of the first sync frame), (ii) a propagation delay, (iii) a mean path delay, and/or (iv) an asymmetric ingress path delay.

Figure 12:
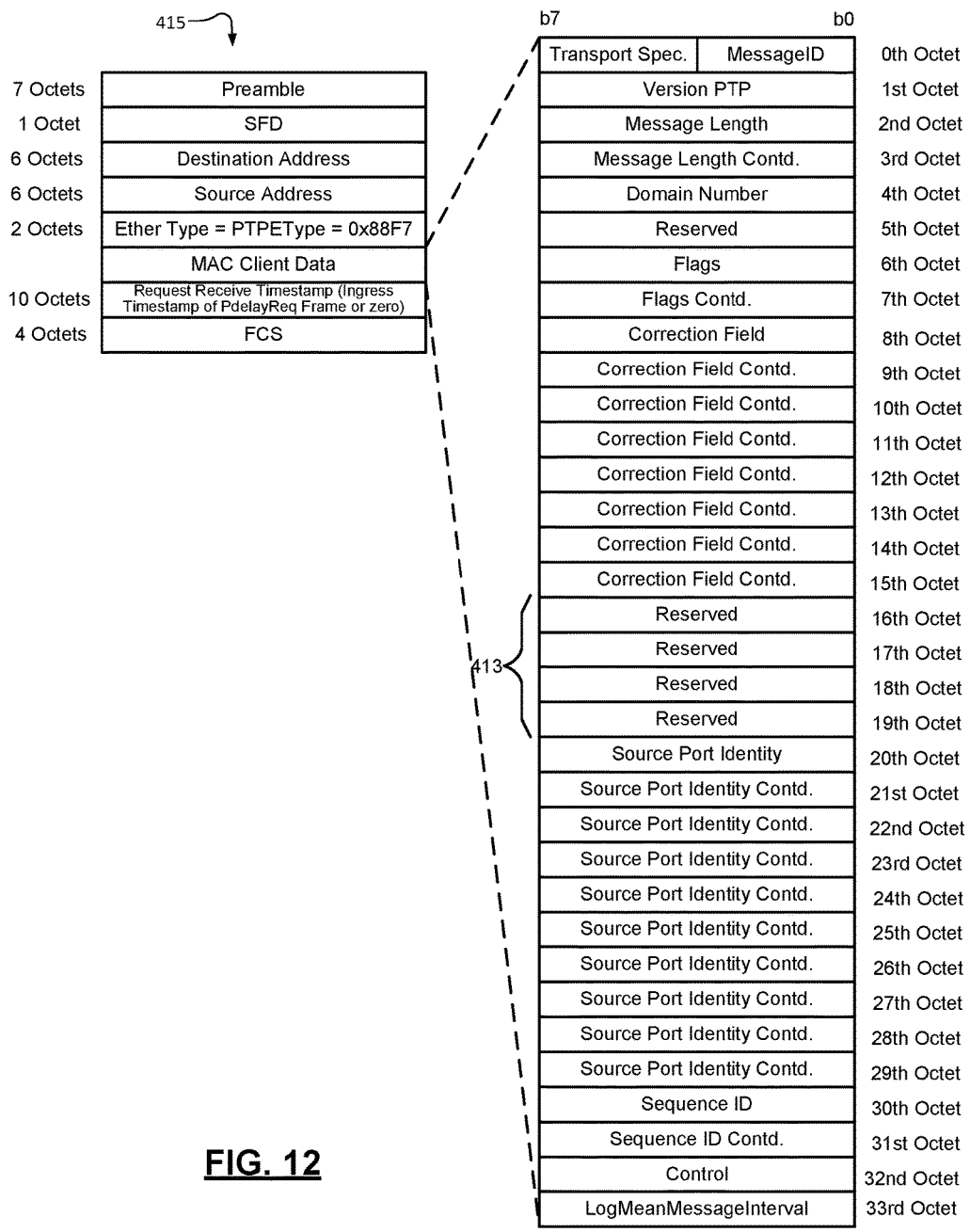
FIG. 12 is a view of an example of a peer delay response message for the second clock PTP method of FIG. 10.
Figure 13:
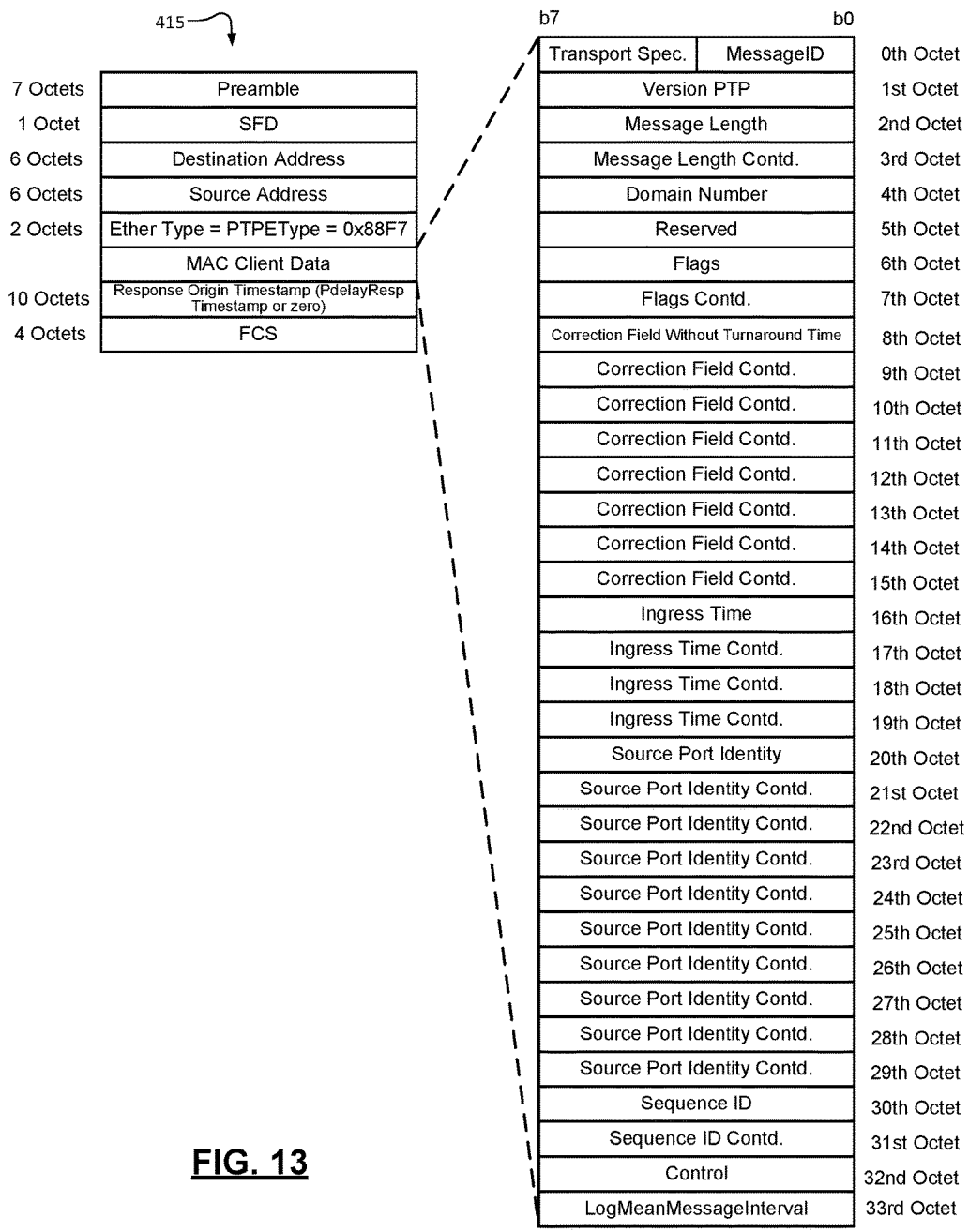
FIG. 13 is a view of an example of a peer delay response follow up message for the second clock PTP method of FIG. 10 according to a first mode and satisfying the first IEEE standard.
Figure 14:
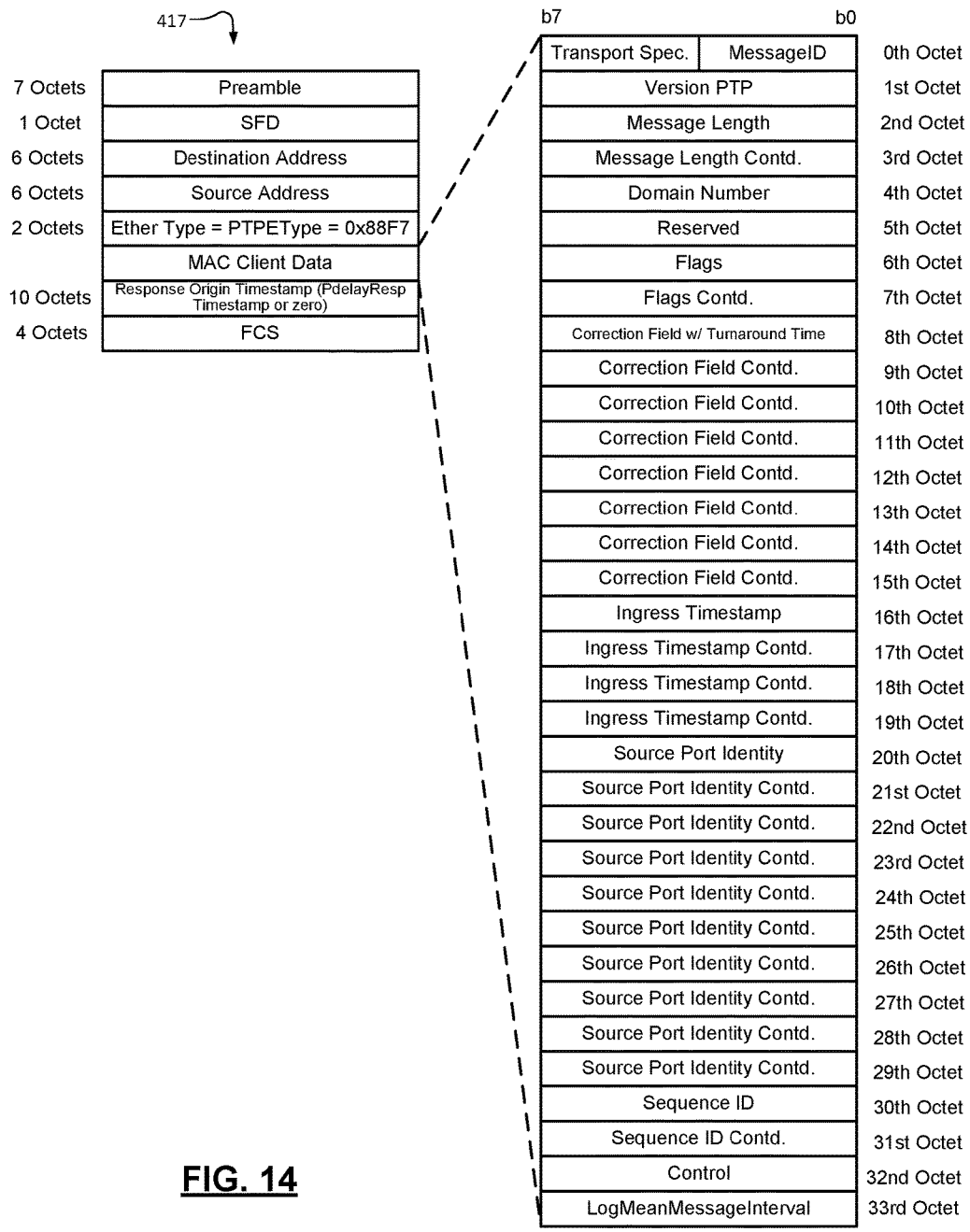
FIG. 14 is a view of another example of a peer delay response follow up message for the second clock PTP method of FIG. 10 according to a second mode and satisfying the first IEEE standard.
Figure 15:
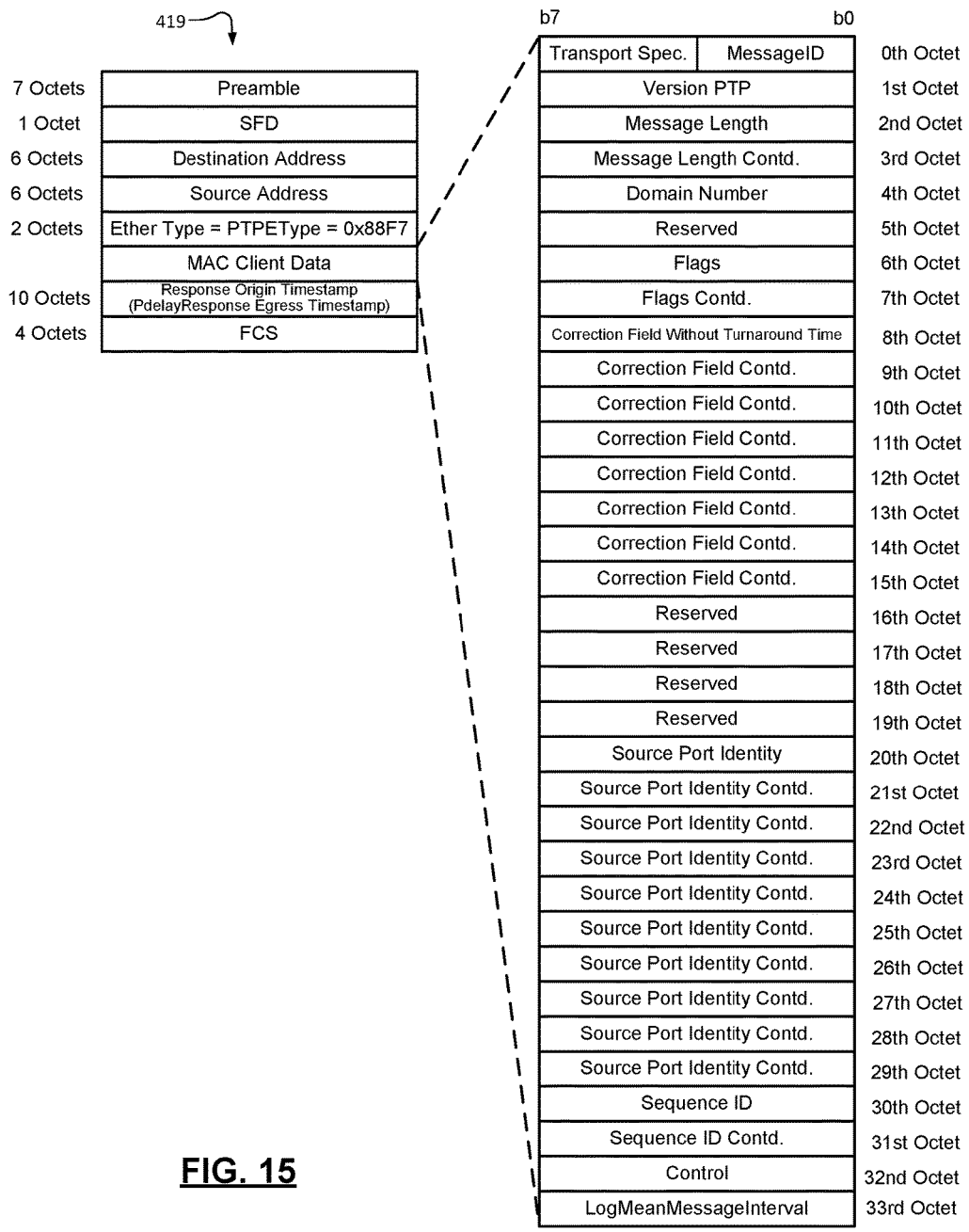
FIG. 15 is a view of an example of another peer delay response follow up message for the second clock PTP method of FIG. 10 that satisfies the second IEEE standard.

At 412, the port 358, prior to or while transmitting the PdelayResp frame: extracts the ingress timestamp of the PdelayReq frame from the PdelayResp frame; clears the ingress timestamp from the PdelayResp frame (i.e. sets a value of second reserved field 413 of an example of the PdelayResp frame 415 of FIG. 12 to a default value); captures an egress timestamp of PdelayResp frame, converts the egress timestamp to a ToD; calculates a turnaround time; and/or calculates a correction field value. The PdelayResp frame 415 may be a PdelayResp frame received at an egress port (or the port 358). The timestamp field of the PdelayResp frame 415 may be a request receipt timestamp. The request receipt timestamp may be an ingress timestamp of the PdelayResp frame 415 or 0 depending on the operating mode. The request receipt timestamp may be an ingress timestamp of the PdelayResp frame 415 when the operating mode is as described below with respect to FIGS. 13 and 15 and the corresponding PdelayRespFollowUp frame is as shown in FIGS. 13 and 15. The request receipt timestamp may be 0 when the operating mode is as described below with respect to FIG. 14 and the corresponding PdelayRespFollowUp frame is as shown in FIG. 14. The conversion of the egress timestamp to the ToD may be performed based on one or more ToDs stored in one or more ToD registers. Examples of generating, storing, and maintaining ToDs in ToD registers of a timing module of a PHY module are described below with respect to FIGS. 16-19. The ToD associated with the egress timestamp of the PdelayResp frame may be stored in a register of the port 358. The turnaround time may be calculated for IEEE 1588 frames and refers to a difference between the ingress time of the PdelayReq frame and the egress time of the PdelayResp frame. The turnaround time may not be calculated for IEEE 802.1AS frames. The correction field value may be calculated based on the turnaround time depending on the IEEE standard being applied. The turnaround time may be added to the initial value of the correction field.

At 414, the port 358 may update fields of the PdelayRespFollowUp frame depending on the operating and/or clock mode of the network device 350. The example shown in FIG. 10 is when the network device 350 is operating in a boundary clock mode or a peer-to-peer transparent clock mode (same operations for both of these modes), as the control module 360 is being offloaded. The port 358 may: update the correction field value of the PdelayRespFollowUp frame based on the calculated correction field value and/or the turnaround time; and/or update the timestamp field of the PdelayRespFollowUp frame to be the ToD associated with the egress timestamp of the PdelayResp frame. The method may end at 416.

Modifications to fields of the PdelayResp frame and the PdelayRespFollowUp frame as described above for tasks 412, 414 may depend on whether the network device 350 is operating in one of two different types of IEEE 1588 operating modes. A register bit stored in a memory of the network device 350 may indicate which one of the modes is enabled. The first mode may include sending absolute values for the ingress time of the PdelayReq frame, the egress time of the PdelayResp frame, and the correction field of the PdelayRespFollowUp frame. This may include: setting the timestamp field of the PdelayResp frame to the ingress time of the PdelayReq frame; setting the timestamp field of the PdelayRespFollowUp frame to the egress time of the PdelayResp frame; and setting the correction field value of the PdelayRespFollowUp frame equal to a fractional nanosecond portion of the egress time of the PdelayResp frame.

While operating in the first mode, the control module 360 has the information needed to generate the PdelayRespFollowUp message while, immediately after and/or subsequent to generating the PdelayResp message except for the PdelayResp egress timestamp. The PdelayResp egress timestamp may be used to set the timestamp field and the correction field of the PdelayRespFollowUp frame. The port 358 may modify these two fields during tasks 412, 414. The control module 360 generates the rest of the PdelayRespFollowUp frame at 410 based on information included in the PdelayReq frame and/or the PdelayResp frame. The control module 360 may set the correction field of the PdelayRespFollowUp frame to be equal to the correction field of the PdelayReq frame. An example of the PdelayRespFollowUp frame 415 is shown in FIG. 13. The PdelayRespFollowUp frame 415 may represent a PdelayRespFollowUp frame out of an egress port (or the port 358). During tasks 412, 414, the egress PHY module 354 may not modify the correction field of the PdelayRespFollowUp frame.

The second mode may include sending a turnaround time, such that the timestamp field of the PdelayResp frame is set to 0; the timestamp field of the PdelayRespFollowUp frame is set to 0; and the correction field value of the PdelayRespFollowUp frame is set equal to and/or is modified based on a difference between the egress time of the PdelayResp frame and the ingress time of the PdelayReq frame. The difference may be added to the correction field value. While operating in the second mode, the control module 360 sets the second reserved field of the PdelayRespFollowUp message to the ingress timestamp of the PdelayReq frame. The ingress timestamp is extracted at the port 358 and is used to calculate the turnaround time. The egress timestamp of the PdelayResp frame is used to set the timestamp field and the correction field of the PdelayRespFollowUp frame. An example of the PdelayRespFollowUp frame 417 is shown in FIG. 14. The PdelayRespFollowUp frame 417 may represent a PdelayRespFollowUp frame received at an egress port (or the port 358). The timestamp of the PdelayRespFollowUp frame 417 is a response origin timestamp, which may be either 0 if operating in the boundary clock mode or a value of an incoming frame if operating in the end-to-end transparent clock mode. The port 358 modifies these two fields during tasks 412, 414. The control module 360 generates the rest of the PdelayRespFollowUp frame during task 410 based on information included in the PdelayReq frame and/or the PdelayResp frame. The port 358 may not modify the timestamp field of the PdelayRespFollowUp frame. For this reason, the control module 360 may set the timestamp field of the PdelayRespFollowUp frame when generated to a predicted egress time of the PdelayResp frame. During task 410, the control module 360 may set the correction field of the PdelayRespFollowUp frame to be equal to the correction field of the PdelayReq frame. During tasks 412, 414, the port 358 may add the turnaround time to the value of the correction field of the PdelayRespFollowUp frame.

For IEEE 802.1AS frames, the timing information may be sent differently via the PdelayResp frame and the PdelayRespFollowUp frame. An example of the PdelayRespFollowUp frame 419 is shown in FIG. 15. The PdelayRespFollowUp frame 419 may represent a PdelayRespFollowUp frame out of an egress port (or port 358). The timestamp of the PdelayRespFollowUp frame 419 may be a response origin timestamp and/or PdelayResponse egress timestamp. The control module 360 may set initial values of (i) the timestamp field of the PdelayResp frame, and (ii) the correction field of the PdelayRespFollowUp frame during tasks 408, 410. The initial value of the timestamp field may be a predicted time. The timestamp field of PdelayResp frame is the ingress timestamp of PdelayReq frame. The correction field value is 0. The port 358 sets the timestamp field of the PdelayRespFollowUp frame to the egress time of the PdelayResp frame during task 414.

The above-described methods automatically update time information in PTP messages while offloading a control module (or central processor), which allows the control module to perform other time critical routines of a highest priority level. This may be referred to as hardware acceleration, as certain tasks are performed by modules other than the control module. The Auto FollowUp methods prevent overloading of the control module operating in a two-step clock PTP mode as if the control module was operating in a one-step clock PTP mode without the added latency of a one-step clock PTP mode. The network devices operating based on the disclosed methods are: compatible with other network devices operating in two-step clock PTP modes; utilize fewer processing gates; and exhibit reduced egress port and corresponding data path latencies, which increases port speeds. The disclosed methods may be implemented without conflicting with a PHY restriction of one byte in for each byte out.

In the above-described methods, ToD information may be determined for (i) egress times included in FollowUp frames prior to be transmitted from network devices, and (ii) ingress and egress timestamp conversions when determining residence times and turnaround times. Instead of a PHY module repetitively requesting a ToD from a central processor, the below-described methods include timing modules of PHY modules maintaining a ToD. When a chip associated with hardware of a network device is out of reset, a control module (e.g., a central processor) signals a PHY module a current ToD, which is based on a grandmaster clock or a clock synchronized to the grandmaster clock. The hardware may include the PHY module, an ingress module, an egress module, and/or other hardware of the network device excluding the control module. The chip may be out of reset, for example, when powered up and/or when a hard and/or soft reset of the chip has occurred and is completed. The PHY module starts maintaining a ToD from the point in time when the current ToD is received from the control module. The ToD maintained by the PHY module is not a floating point time. Periodic adjustments to the ToD of the PHY module may be performed by a timing module based on compensation values received from the control module to compensate for local clock changes. Local clock changes (or drifting) can occur due to changes in temperature and/or other parameters that effect operation of a clock.

In one embodiment, a ToD is represented as 6 bytes of seconds and 4 bytes of nanoseconds value. A timing module of a PHY module may include a seconds counter and a nano-second counter. When the nano-second counter reaches 1,000,000,000 nS (at a 1 second point in time), the nano-second counter is reset to zero and the seconds counter is incremented. Although a frequency of a local clock is known, a parts-per-million (ppm) offset (or error in the frequency) can exist. To account for the ppm offset and increase accuracy of the ToD, a compensation value may be generated. The compensation value is an amount of time that is added to or subtracted from each period of the local clock in order for the local clock frequency to match a frequency of the grandmaster clock. The compensation value is a value that is accumulated at each clock cycle and once the compensation value reaches 1 nano-second (ns), the nano-second counter is adjusted (incremented or decremented by the 1 ns).

The compensation value may be stored in a programmable register, where 31 bits are stored for the compensation value and an additional direction bit is stored to indicate if the ToD of the timing module is fast or slow compared to the grandmaster clock ToD. The compensation value defines (i) a difference between the grandmaster clock and a local clock, and/or (ii) a difference between the grandmaster clock and a ToD of the timing module. As an example, the difference may be in increments of 465.661 zeptoseconds (or 4.65661E-19 seconds, which is less than a single attosecond). For reference, picosecond is $10^{-12}$, femtosecond is $10^{-15}$, attosecond is $10^{-18}$ and zeptosecond is $10^{-21}$. A difference of 1 PPM for a 125 mega-hertz (MHz) local PTP clock is 8 femtoseconds (8.0E-15 seconds) or a setting of 17,182 decimal (0x431E) in the programmable register. A full range of the programmable register (0x7FFF FFFF) results in 1.0 ns of compensation per local PTP clock cycle. As an example, a compensation value of 0 in the direction bit indicates that the local PTP clock is slow (i.e. add the compensation value to each cycle). A compensation value of 1 indicates that the local PTP clock is fast (i.e. subtract the compensation value from each cycle).

The timing module can continue to maintain the ToD once the timing module is provided with an initial ToD. After the chip is out of reset, the control module may program the initial TOD to match a grandmaster ToD (e.g., store the initial ToD in a register accessible to the timing module). From that point in time forward, the timing module maintains the ToD in the PHY module. Periodically the control module may check if the ToD maintained by the timing module has drifted. Based on the amount of drift, the control module adjusts the compensation value.

FIG. 16 shows a portion 450 of a system of a network device illustrating time of day determination and maintenance in a port 451 of a PHY module 452. The portion 450 includes the PHY module 452 and a control module 454. The PHY module 452 includes the port 452, which includes a timing module 455 and a memory 456. Any of the PHY modules, ports, timing modules and/or control modules disclosed herein may operate as the PHY module 452, port 451, the control module 454 and the timing module 455. The control module 454 includes a compensation module 457. The timing module 455 includes an accumulation module 460, an accumulated nanosecond register 462, a ToD module 464, one or more ToD registers (a first ToD (or seconds) register 466 and a second ToD (or nanoseconds) register 468 are shown), and a counter 469. The counter 469 may be a 32-bit free running counter of clock ticks and provide a local hardware time. The counter 469 may operate and/or be incremented based on the local clock signal ClockL. The counter 469 operates when the PHY module 452 is out of reset. The local hardware time may be provided to the ToD module 464 and transferred from the ToD module 464 to the memory 456. The memory 456 may be referred to as a register module and includes a ToD compensation register 470, a hardware time/loadpoint register 472, a third ToD (or seconds) register 474, a fourth ToD (or nanoseconds) register 476, an enable register 478 and a capture register 480.

The registers 132, 186, 224 of FIGS. 2-4 may each be replaced with multiple registers, which may be used similar to the registers 466, 468. The PHY module 452 may include and/or have access to a local clock 480 and may operate based on a local clock signal ClockL. The control module 454 and the timing module 455 may have access to the local clock 480. In one embodiment, a frequency of the local clock 480 is a same frequency as or is within a predetermined range of a frequency of the grandmaster clock signal ClockG. Operation of the modules, registers and clocks of the portion 450 are further described below with respect to FIG. 17.

Figure 17:
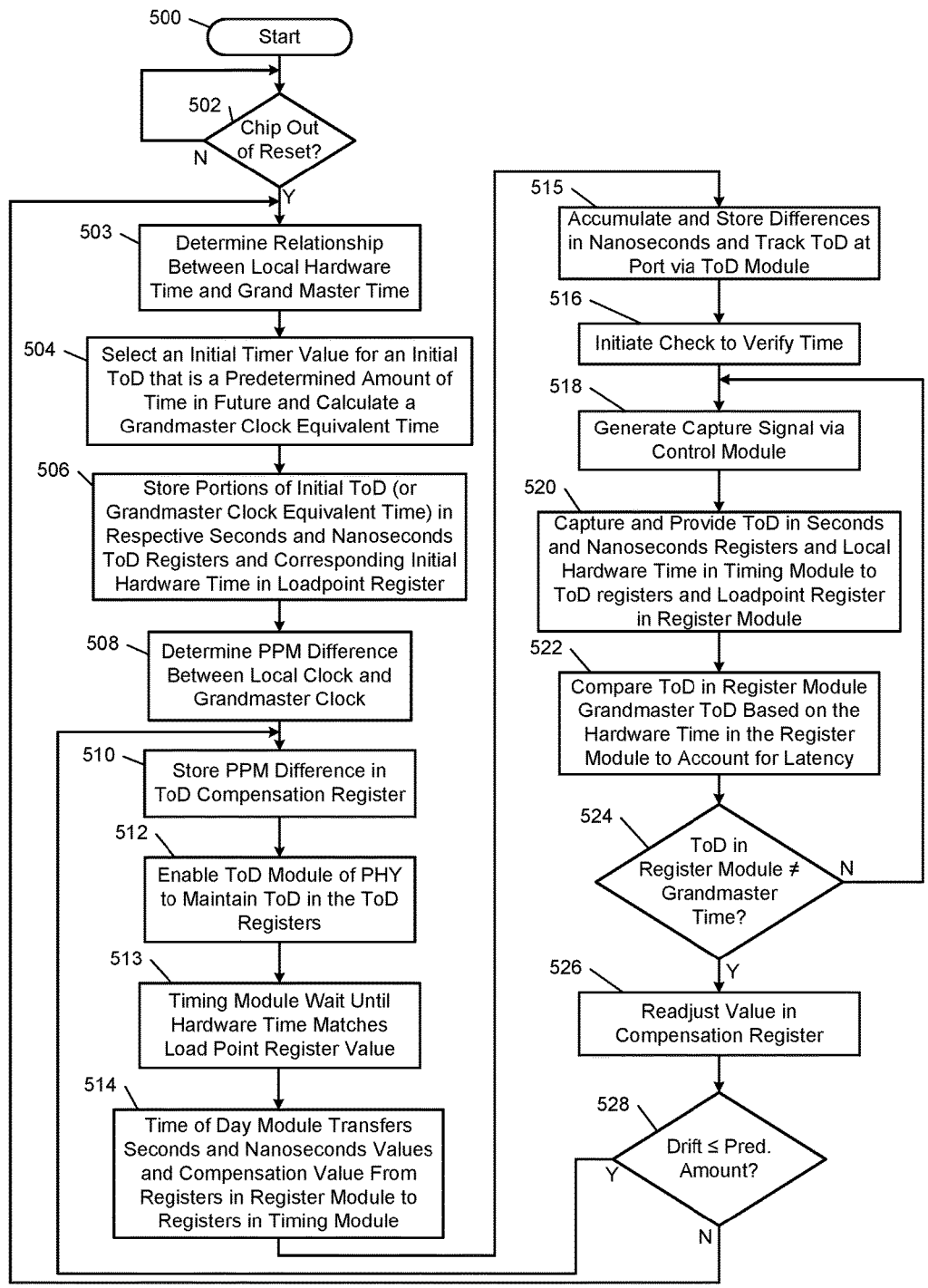
FIG. 17 illustrates an example method of initializing and maintaining an accurate time of day in a port of a PHY module in accordance with an embodiment of the present disclosure.
Figure 18:
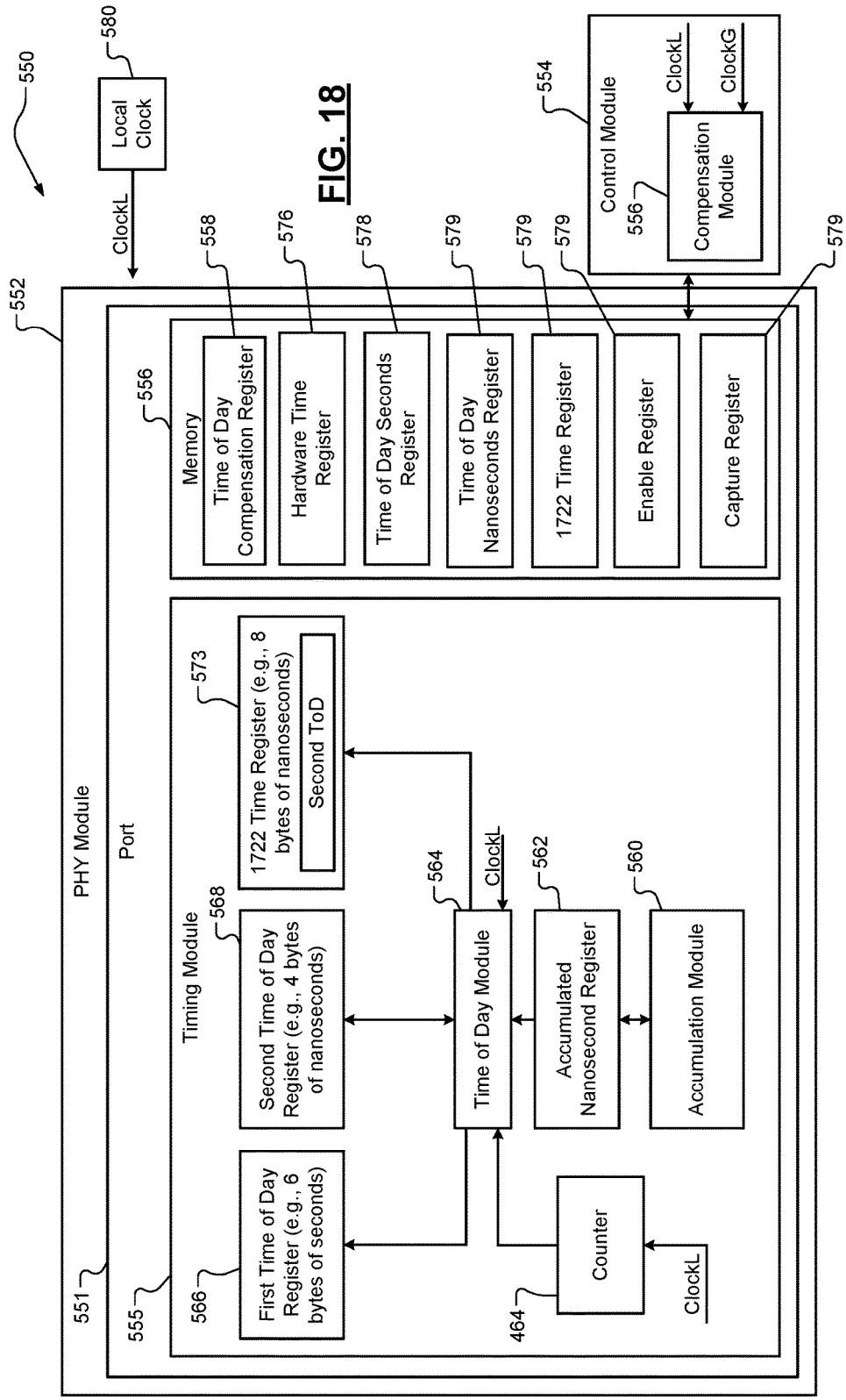
FIG. 18 is a functional block diagram of an example portion of a system of a network device illustrating time of day determination and maintenance for two time of day formats in a port of a PHY module and in accordance with an embodiment of the present disclosure.

FIG. 17 shows a method of initializing and maintaining an accurate time of day in the port 451 of FIG. 16. The method includes the control module 454 enabling, initializing and aiding in maintaining a ToD within the port 451. Although the following tasks are primarily described with respect to the implementation of FIG. 16, the tasks may be easily modified to apply to other implementations of the present disclosure. The tasks may be iteratively performed.

The method may begin at 500. At 502, if the PHY module 452 (or a chip in which the PHY module 452 is located) is out of reset, task 503 is performed. At 503, the control module 454 determines an initial relationship between the local hardware time of the counter 469 and the grandmaster time ClockG. The ToD module 464 may periodically, at predetermined times, or continuously store the local hardware time of the counter 469 in the hardware time register 472. The control module 454 may access the hardware time register 472 to obtain the local hardware time. As another example, the relationship between the local hardware time and the grandmaster time may be determined through a series of sync and followup messages transmitted between the network device (or first network device) and another network device (or second network device).

At 504, the control module 454 selects an initial (or reset) timer value for a future time and calculates an associated ToD based on the grandmaster time of the grandmaster clock signal ClockG. The selected timer value may be a predetermined amount of time into the future and/or may be based on an amount of delay for the PHY module 452 to update a ToD, which is maintained by the PHY module 452 based on the selected timer value. The control module 454 may convert the selected timer value to a grandmaster time and as a result provide an initial (or reset) ToD.

At 506, the control module 454 may store respective portions of the initial ToD in the registers 474, 476 and a corresponding initial hardware time in the loadpoint register 472. The initial ToD and the initial hardware time may be the same time, but in different formats. The initial ToD is comparable to the local and grandmaster clock times, whereas the initial hardware time is comparable to the value of the counter 469. The seconds portion of the initial ToD is stored in the first ToD register 466 (e.g., a register that stores 6 bytes). The nanoseconds portion of the initial ToD is stored in the second ToD register 468 (e.g., a register that stores 4 bytes).

At 508, the compensation module 457 of the control module 454 determines a parts-per-million (PPM) difference between a frequency of local clock signal ClockL1 and a frequency of a grandmaster clock ClockG. At 510, the compensation module 457 stores the PPM difference in the ToD compensation register 470.

At 512, the control module 454 enables the ToD module 464 to begin maintaining (i.e. updating) the ToD stored in the ToD registers 466, 468 by setting an enable bit in the enable register 478 HIGH. At 513, the ToD module 464 waits until the local hardware time of the counter 469 matches the initial hardware time in the loadpoint register 472 before proceeding to task 514.

At 514, the ToD module 464 accesses the ToD stored in the registers 474, 476 and stores the ToD in the registers 466, 468. The ToD stored in the ToD registers 466, 468 may be referred to as the PHYToD. During task 514, the timing module 455 and/or accumulation module 460 may also load the compensation value stored in the ToD compensation register 470 into the accumulated nanoseconds register 462.

At 515, the timing module 455 and/or the accumulation module 460 accumulate compensation values in the accumulated nanoseconds register 462. From this point in time forward, the ToD module 464 may maintain (or update) the PHYToD stored in the registers 466, 468 based on the value and/or local hardware time of the counter 469. The port 451 may continuously maintain the PHYToD while periodically accounting for PPM compensation. This periodic compensation may be performed as described with respect to tasks 516-526.

At 516, the control module 454 may initiate a check to verify the ToD stored in the registers 466, 468. At 518, the compensation module 456 may generate a capture signal to capture the ToD stored in the ToD registers 466, 468 and the local hardware time of the counter 469. The capture signal may set a capture bit in the capture register 480 HIGH indicating to the ToD module 464 to store the ToD and the local hardware time in the registers 474, 476, 472. At 520, the ToD stored in the registers 466, 468 and the local hardware time of the counter 469 are captured and stored in the registers 474, 476, 472. The ToD module 464, based on the capture bit, transfers the ToD stored in the registers 466, 468 and the local hardware time to the registers 474, 476, 472, which may then be accessed by the compensation module 456. This may include overwriting the values previously stored in the registers 474, 476, 472.

At 522, the compensation module 456 compares the ToD stored in the registers 466, 468 to the ToD of the grandmaster clock signal ClockG and updates the value stored in the ToD compensation register 458. This may be based on the local hardware time stored in the loadpoint register 472 and a predetermined delay from when the capture signal is generated to when the ToD in the registers 466, 468 should be stored in the registers 474, 476 and/or when task 522 should be performed. This allows the compensation module 456 to account for delays associated with the capturing of the ToD when determining if any drift in time exists between the ToD and the grandmaster time of the grandmaster clock signal ClockG. As an example, a sum of the captured ToD, an amount of delay time, and an amount of drift that has occurred may be equal to the grandmaster time. The amount of drift refers to how much the ToD maintained by the ToD module 464 has changed from the grandmaster time. Thus, a difference between the ToD and the grandmaster time minus the predetermined amount of delay may provide the amount of drift. Task 522 may include storing the determined difference that accounts for the delay in the ToD compensation register 470.

At 524, the compensation module 456 and/or the control module 454 determines if the captured ToD has drifted from the grandmaster clock signal ClockG based on the determined difference, as described above with respect to task 522. If the amount of drift is greater than 0 or a predetermined value, then task 526 may be performed to reset the ToD stored in the registers 466, 468, 474, 476 to match the ToD indicated by the grandmaster clock signal ClockG. If there is no drift or the amount of drift is less than the predetermined value, then task 518 may be performed.

At 526, the control module 454 readjusts the compensation value stored in the ToD compensation register 470. At 528, the control module 454 determines whether the amount of drift was less than a second predetermined value (indicative of a small amount of drift). If the amount of drift is less than the second predetermined value, task 510 is performed, otherwise task 503 is performed.

The availability of ToD information in a frame helps offload a control module of some PTP processing. However, the control module may perform other PTP processing to convert a time to be in an IEEE 1722 audio video transport protocol (AVTP) format. A large number of timestamp conversions may be performed per data stream (e.g., 8000 or more timestamps per second per data stream). Performance of this task can cause a bottleneck for the control module.

To prevent and/or minimize this bottleneck, a timing module (e.g., any one of the timing modules disclosed herein) that maintains ToD information can create a 4 byte value in an IEEE 1722 time format. The 4 byte value is an IEEE 1722 time including 4 bytes of nanoseconds. If the timing module is able to provide the 4 byte value in the IEEE 1722 time format, audio devices or other time aware devices in the corresponding network device can directly use the 4 byte value. This offloads a control module of the network device and frees up the control module to support multiple streams of data.

The accumulation module 460 may be used to track nanosecond differences to provide the 4 byte value or lower 4 bytes of a ToD. The lower 4 bytes of the ToD are nanoseconds, but wrap a second's byte of the ToD every 1 second of time accumulated via the lower 4 bytes according to IEEE 1588. The IEEE 1722 time is 4 bytes of nanoseconds that are used to count a full 32 bits (a count of more than 4 seconds) instead of only 30 bits as may be performed according to IEEE 1588. Since the IEEE 1722 ToD and the IEEE 1588 ToD are based on nanoseconds, maintaining the IEEE 1722 ToD is easily achieved by basing the IEEE 1722 ToD on the IEEE 1588 ToD. Though AVTP requires only 32 bits of the IEEE 1722 time for audio, generating a 64 bit IEEE 1722 value may be used for other IEEE 1722 formats. Thus, the IEEE 1722 time may be an 8 byte nanosecond value.

An IEEE 1722 time, having 8 bytes indicative of a number of nanoseconds representing a current ToD, may be provided by a timing module performing as a binary counter and counting time in nanoseconds. The timing module may continue to keep the time once a starting value (e.g., the initial ToD) is selected and/or programmed. Although a local crystal clock frequency may be known, a ppm offset may exist in frequency. To account for this ppm difference and to make IEEE 1722 time calculations more accurate, a compensation module (e.g., the compensation module 456) may be used to adjust the ToD maintained by the PHY module.

Both the ToD maintained above by the PHY module 452 with respect to the method FIG. 17 and the IEEE 1722 time are representative of a same current time, but are in different formats. Thus, the compensation calculation performed by the compensation module 456 (which is counting in nanoseconds) may be the same for both of these time formats. The same compensation logic may be used to adjust both (i) the ToD maintained above by the port 451 with respect to the method FIG. 17, and (ii) the IEEE 1722 time.

FIG. 18 shows a portion 550 of a system of a network device illustrating ToD determination and maintenance for two ToD formats in a port 551 of a PHY module 552. The portion 550 includes the PHY module 552 and a control module 554. The PHY module includes a timing module 555 and a memory 556. Any of the PHY modules, ports, control modules and/or timing modules disclosed herein may operate as the PHY module 552, the port 551, the control module 554 and the timing module 555. The control module 554 includes a compensation module 557. The timing module 555 includes an accumulation module 560, an accumulated nanosecond register 562, a ToD module 564, one or more ToD registers, and a counter 574. The one or more ToD registers may include a first ToD register 566, a second ToD register 568, and a third ToD register (may be referred to as an "IEEE 1722 time register") 573, as shown and/or other ToD registers. The registers 566, 568 store a ToD in a first format (or first ToD), which may be an IEEE 1588 format. The third ToD register stores the ToD in a second format (or the second ToD), which may be an IEEE 1722 format. The counter 574 may be a 32-bit free running counter of clock ticks and provide a local hardware time. The counter 574 may operate and/or be incremented based on the local clock signal ClockL. The counter 574 operates when the PHY module 552 is out of reset. The local hardware time may be provided to the ToD module 564 and transferred from the ToD module 564 to the memory 556. The memory 556 may be referred to as a register module and includes a ToD compensation register 576, a hardware time/loadpoint register 578, a third ToD (or seconds) register 580, a fourth ToD (or nanoseconds) register 582, a fifth ToD (or 1722 time) register 584, an enable register 586 and a capture register 588.

The registers 132, 186, 224 of FIGS. 2-4 may each be replaced with multiple registers, which may be used similar to the registers 566, 568. The PHY module 552 may include and/or have access to a local clock 590 and may operate based on a local clock signal ClockL. The control module 554 may include and/or have access to the local clock 590. In one embodiment, a frequency of the local clock 580 is a same frequency as or is within a predetermined range of a frequency of a grandmaster clock signal ClockG. Operation of the modules, registers and clocks of the portion 550 are further described below with respect to FIG. 19.

Figure 19:
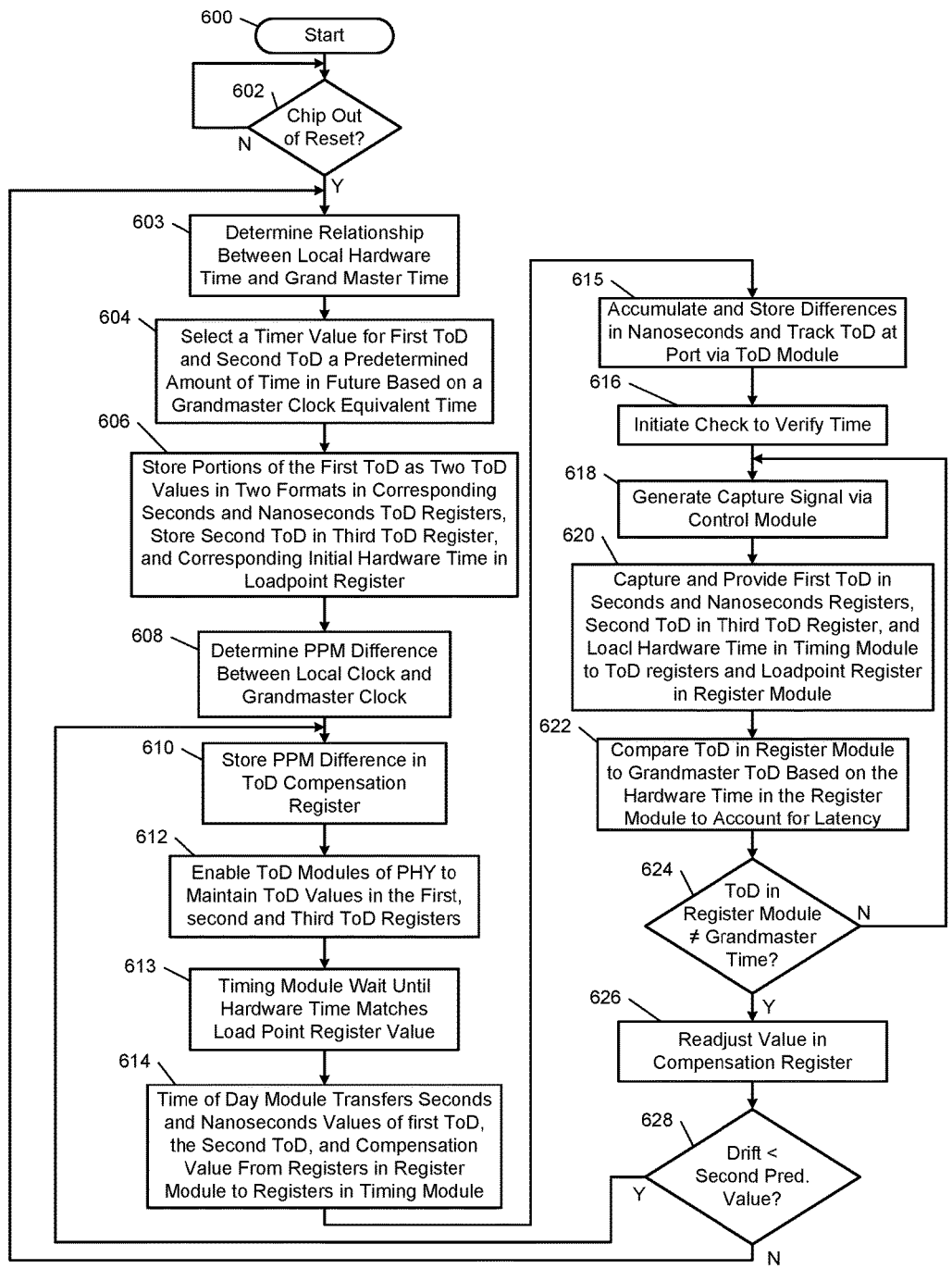
FIG. 19 illustrates an example method of initializing and maintaining two accurate time of day formats in a port of a PHY module in accordance with an embodiment of the present disclosure.

FIG. 19 shows a method of initializing and maintaining two accurate time of day formats in the port 551 of FIG. 18. Although the following tasks are primarily described with respect to the implementation of FIG. 18, the tasks may be easily modified to apply to other implementations of the present disclosure. The tasks may be iteratively performed.

The method may begin at 600. At 602, if the PHY module 552 (or a chip in which the PHY module 552 is located) is out of reset, task 603 is performed. At 603, the control module 554 determines an initial relationship between the local hardware time of the counter 574 and the grandmaster time ClockG. The ToD module 564 may periodically, at predetermined times, or continuously store the local hardware time of the counter 574 in the hardware time register 578. The control module 554 may access the hardware time register 578 to obtain the local hardware time. As another example, the relationship between the local hardware time and the grandmaster time may be determined through a series of sync and followup messages transmitted between the network device (or first network device) and another network device (or second network device).

At 604, the control module 554 selects a first initial (or reset) timer value and a second initial (or reset) timer value for a future time based on the grandmaster time of the grandmaster clock signal ClockG. The selected timer values may be for a predetermined amount of time into the future and/or may be based on an amount of delay for the PHY module 552 to update ToD values. The ToD values are maintained by the PHY module 552 based on the selected timer values. The control module 554 may convert the selected timer values to grandmaster times and as a result provide initial (or reset) ToDs.

At 606, the control module 554 may store respective portions of the first initial ToD in the registers 580, 582 and a corresponding initial hardware time in the loadpoint register 578. The seconds portion of the first initial ToD is stored in the first ToD register 580 (e.g., a register that stores 6 bytes). The nanoseconds portion of the first initial ToD is stored in the second ToD register 582 (e.g., a register that stores 4 bytes). The initial ToD and the initial hardware time may be the same time, but in different formats. The initial ToD is comparable to the local and grandmaster clock times, whereas the initial hardware time is comparable to the value of the counter 574. The control module 554 may also store a second initial ToD in the third ToD register 584. The second initial ToD may be the same time, but in a different format than the first initial ToD.

At 608, the compensation module 557 determines a parts-per-million (PPM) difference between a frequency of the local clock signal ClockL and a frequency of the grandmaster clock signal ClockG. At 610, the compensation module 556 stores the PPM difference in the ToD compensation register 558.

At 612, the control module 554 enables the ToD module 564 to begin maintaining (i.e. updating) the ToDs stored in the registers 566, 568, 573 by setting an enable bit in the enable register 586 HIGH. At 613, the ToD module 564 waits until the local hardware time of the counter 574 matches the initial hardware time in the loadpoint register 578 before proceeding to task 614.

At 614, the ToD module 564 accesses the first ToD stored in the registers 580, 582 and stores the first ToD in the registers 566, 568. The first ToD stored in the ToD registers 566, 568 may be referred to as the first PHYToD. The ToD module 564 also accesses the second ToD stored in the ToD register 584 and stores the second ToD in the ToD register 573. The second ToD stored in the ToD register 573 may be referred to as the second PHYToD. During task 614, the timing module 555 and/or accumulation module 560 may also load the compensation value stored in the ToD compensation register 576 into the accumulated nanoseconds register 562.

At 615, the timing module 555 and/or the accumulation module 560 accumulate compensation values in the accumulated nanoseconds register 562. From this point in time forward, the ToD module 564 may maintain (or update) the first PHYToD and the second PHYToD stored in the registers 566, 568, 573 based on the value and/or local hardware time of the counter 574. The port 551 may continuously maintain the PHYToDs while periodically accounting for PPM compensation. This periodic compensation may be performed as described with respect to tasks 616-626.

At 616, the control module 554 may initiate a check to verify the ToDs stored in the registers 566, 568, 573. At 618, the control module 554 may generate a capture signal to capture the ToDs stored in the registers 566, 568, 573 and the local hardware time of the counter 574. The capture signal may set a capture bit in the capture register 588 HIGH indicating to the ToD module 564 to store the ToDs in the registers 566, 568, 573 and the local hardware time in the registers 578, 580, 582, 584. At 620, the ToD module 564, based on the capture bit, transfers the ToDs stored in the registers 566, 568, 573 and the local hardware time to the registers 578, 580, 582, 584, which may then be accessed by the compensation module 557. This may include overwriting the values previously stored in the registers 578, 580, 582.

At 622, the compensation module 556 compares the ToDs stored in the registers 566, 568, 573 to the ToD of the grandmaster clock signal ClockG and updates the value stored in the ToD compensation register 576. This may be based on the local hardware time stored in the loadpoint register 578 and a predetermined delay from when the capture signal is generated to when the ToDs in the registers 566, 568, 573 should be stored in the registers 580, 582, 584 and/or when task 622 should be performed. This allows the compensation module 557 to account for delays associated with the capturing of the ToDs when determining if any drift in time exists between the ToDs and the grandmaster time of the grandmaster clock signal ClockG. As an example, a sum of any one of the captured ToDs with an amount of delay time and an amount of drift that has occurred for the corresponding one of the ToDs may be equal to the grandmaster time. The amount of drift refers to how much the corresponding ToD maintained by the ToD module 555 has changed from the grandmaster time. Thus, a difference between the corresponding ToD and the grandmaster time minus the predetermined amount of delay may provide the amount of drift. The amount of drift associated with the first ToD may be equal to the amount of drift associated with the second ToD. Task 622 may include storing one or more of the determined differences that account for the delay in the ToD compensation register 470.

At 624, the compensation module 554 and/or the control module 554 determines if the captured ToDs have drifted from the grandmaster clock signal ClockG based on the determined differences, as described above with respect to task 622. If the amount of drift is greater than 0 or a predetermined value, then task 626 may be performed to reset the ToDs stored in the registers 566, 568, 573, 580, 582, 584 to match the ToD indicated by the grandmaster clock signal ClockG. If there is no drift or the amount of drift is less than the predetermined value, then task 618 may be performed. The above tasks allow the ToDs maintained by the ToD module 555 to be periodically checked against the ToD of the grandmaster clock signal ClockG. When there is drift in the maintained ToDs, which may occur since the maintained ToDs are not floating points, the control module 554 recalculates and programs the compensation value stored in the ToD compensation register 576 to account for the drift.

At 626, the control module 554 readjusts the compensation value stored in the ToD compensation register 576. At 628, the control module 554 determines whether the amount of drift was less than a second predetermined value (indicative of a small amount of drift). If the amount of drift is less than the second predetermined value, task 610 is performed, otherwise task 603 is performed.

The above-described method of FIG. 19 includes maintaining two ToDs in different formats within a port of a PHY module with minimal control module involvement. A timing module and/or hardware of the PHY module that has a ToD counter (e.g., the above-disclosed ToD modules) and performs as described above provides an efficient two-step implementation to offload a control module (or processor). If the PHY module maintains an IEEE 1722 ToD in native 64-bit and 32-bit formats, the control module is further offloaded, as the number of occurrences of IEEE 1722 timestamps can be 1000 times more often per data stream than other types of timestamps.

The described examples also enable a PHY module to support multiple time domains. By maintaining a first ToD (e.g., a ToD in an IEEE 1588 time format) and a second ToD (e.g., a ToD in an IEEE 1722 time format) per time domain, the PHY module can handle frames of different time domains. As an example, multiple timing modules (e.g., one of the timing modules of FIG. 16 or 18) may be included in a network device. Each timing module may be associated with a respective time domain and operate based on a respective grandmaster clock. A control module may have multiple grandmaster clocks and generate ToD compensation values for the timing modules based on the respective grandmaster clocks. Each port of the network device may communicate with a selected one of the timing modules, depending on the domain in which the port is operating. Each frame received at a port may have a domain field indicating one of the time domains. The port may select one of the timing modules based on the domain field.

The above-described tasks of FIGS. 6, 11, 17 and 19 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

Figure 20:
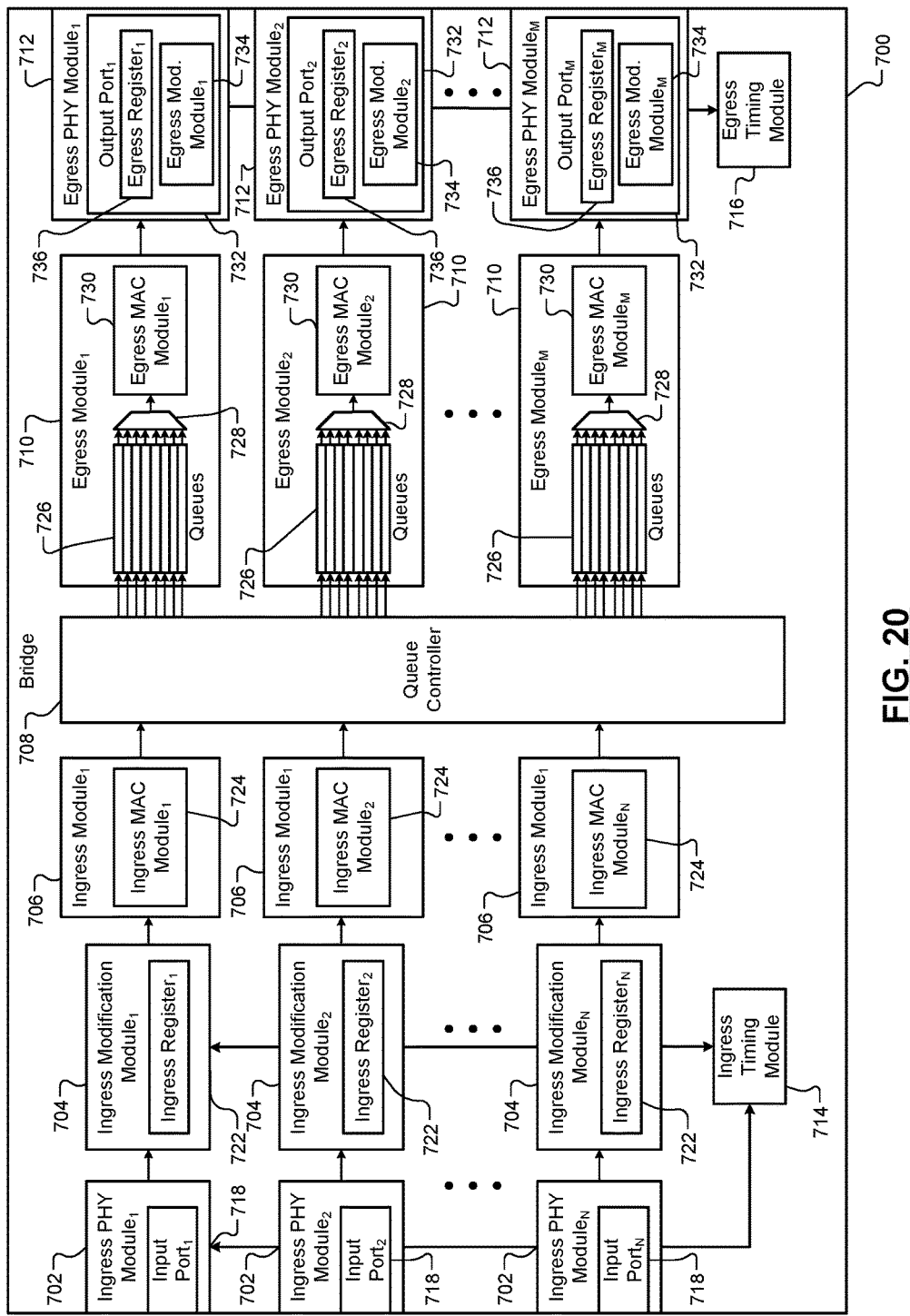
FIG. 20 is a functional block diagram of an example of another bridge in accordance with an embodiment of the present disclosure.

FIG. 20 shows a bridge 700 that includes ingress PHY modules 702, ingress modification modules 704, ingress modules 706, a queue controller 708, egress modules, 710 and egress PHY modules 712, an ingress timing module 714 and an egress timing module 716. The bridge 700 may operate similar to the bridge 150 of FIG. 3 and/or may replace the bridge 150 of FIG. 3. Although the ingress modification modules 704 are shown between the ingress PHY modules 702 and the ingress modules 706, the ingress modification modules 704 may be implemented within the ingress PHY modules 702, input ports 718 of the ingress PHY modules 702, or in the ingress modules 706. The ingress modification modules 704 may perform any of the input timestamping and/or frame modifications described above with respect to received frames. For example, the ingress modification modules 704 may timestamp received frames (e.g., sync frames or peer delay request frames) based on timing signals received from the ingress PHY modules 702 and/or the input ports 718. The ingress PHY modules 702, the input ports 718, and/or the ingress modification modules 704 may maintain ToDs based on communication with the ingress timing module 714, as described above. The ingress timing module 714 may operate similar to the timing modules 455, 555 of FIGS. 16 and 18. The ingress modification modules 704 may modify fields of the frames to indicate the timestamps. The ingress PHY modules 702, the input ports 718, the ingress modification modules 704, and/or the ingress modules 706 may include ingress registers (ingress registers 722 are shown). The ingress registers may be used as loadpoint registers, as described above.

The ingress modules 706 may include ingress MAC modules 724. The queue controller 708 may be connected between the ingress modules 706 and the egress modules 710 and be used to transfer frames between each of the ingress modules 706 and queues 726 of the egress modules 710. Although a queue controller is not shown in the example of FIG. 3, a queue controller may be included between the bridge ingress module 152 and the bridge egress module 154.

The egress modules 710 include the queues 726, multiplexers 728, and egress MAC modules 730. The multiplexers 728 select from which queue to pass a frame to the egress MAC modules 730. The egress PHY modules 712 receive the frames from the egress modules 710 and transmit the frames from the bridge 700. The egress PHY modules 712 may include output ports 732 with egress modification modules 734 and egress registers 736. Although the egress modification modules 734 and the egress registers 736 are shown as being included in the egress PHY modules 712, the egress modification modules 734 and the egress registers 736 may be included in the egress modules 710. The egress modification modules 734 may be connected between the egress modules 710 and the egress PHY modules 712.

The PHY modules 702 and 712 may be of different types, such as cross-wire media independent interface (xMII) or giga-byte Ethernet (GE). The PHY modules 702, 712 may include serializer/deserializers (SERDESs). For example, one or more of the ingress PHY modules 702 may convert a serial signal to multiple parallel signals, which are received by the modification modules 704 or the ingress modules 706. One or more of the egress PHY modules 712 may convert parallel signals to a serial signal.

The egress modification modules 734 may perform modifications to fields of frames prior to the frames being transmitted from the output ports 732. The modifications may be any of the modifications disclosed herein including timestamping and/or inclusion and/or modification of ToD fields, residence time fields, correction fields and/or other fields of the frames. If the egress modification modules 734 are not included in the output ports 732, then the output ports 732 and/or the egress PHY modules 712 may send signals to the egress modification modules 734 indicating frame egress times. The egress PHY modules 712, the output ports 732, and/or the modification modules 734 may maintain ToDs, which may be used to set ToD fields in frames (e.g., FollowUp frames). The egress timing module 716 may operate similar to the timing modules 455, 555 of FIGS. 16 and 18.

The wireless communications described in the present disclosure can be conducted in full or partial compliance with IEEE standard 802.11-2012, IEEE standard 802.16-2009, IEEE Standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A network device comprising:
  a first port comprising
    a register module to receive a first time of day from a control module, wherein the control module is separate from the network device, wherein the first time of day is a future time and is based on a grandmaster clock signal, and wherein the register module comprises
      a first one or more time of day registers, wherein the first one or more time of day registers are to store the first time of day,
      a loadpoint register to store an initial hardware time, wherein the control module selects the initial hardware time, and
      a compensation register to store a compensation value received from the control module, wherein the compensation value is determined based on a difference between a local clock signal and the grandmaster clock signal, and
    a timing module to operate based on the local clock signal, wherein the timing module comprises
      a second one or more time of day registers, and
      a time of day module to, when a local hardware time of the timing module matches the initial hardware time, (i) transfer the first time of day from the first one or more time of day registers to the second one or more time of day registers, (ii) begin updating the first time of day stored in the second one or more time of day registers based on the local clock signal, and (iii) update the first time of day based on the compensation value.

2. The network device of claim 1, wherein:
the register module comprises an enable register;
the enable register is to store an enable bit;
the enable bit is set by the control module; and
the time of day module is to, subsequent to the control module setting the enable bit and based on the local clock signal, update the first time of day stored in the second one or more time of day registers.

3. The network device of claim 1, wherein:
the first one or more time of day registers include a first time of day register and a second time of day register;
the first time of day register and the second time of day register are to store respective portions of the first time of day;

the second one or more time of day registers include a third time of day register and a fourth time of day register; and
the time of day module is to, when the local hardware time of the timing module matches the initial hardware time, (i) transfer the first time of day from the first time of day register and the second time of day register to the third time of day register and the fourth time of day register, and (ii) begin updating the first time of day stored in the third time of day register and the fourth time of day register based on the local clock signal.

4. The network device of claim 3, wherein:
the register module comprises a capture register;
the capture register is to store a capture bit;
the capture bit is set by the control module; and
the time of day module is to, subsequent to the control module setting the capture bit, (i) capture the first time of day by transferring the first time of day from the third time of day register and the fourth time of day register to the first time of day register and the second time of day register, and (ii) capture the local hardware time in the loadpoint register.

5. The network device of claim 4, wherein:
the register module comprises a fifth time of day register;
the fifth time of day register is to store a second time of day, wherein the second time of day is in a different format than the first time of day;
the timing module comprises a sixth time of day register;
the sixth time of day register is to store the second time of day; and
the time of day module is to (i) update the second time of day in the sixth time of day register, and (ii) based on the capture bit, capture the second time of day by transferring the second time of day from the sixth time of day register to the fifth time of day register.

6. The network device of claim 4, wherein:
the timing module comprises a counter;
the counter is to operate based on the local clock signal; and
the time of day module generates the local hardware time based on a value of the counter.

7. A system comprising:
the network device of claim 4; and
the control module further to, based on the local hardware time, determine an amount of drift of the first time of day by comparing the time of day captured in the first time of day register and the second time of day register to a grandmaster time indicated via the grandmaster clock signal,
wherein the control module is further to adjust the compensation value based on the amount of drift.

8. The network device of claim 1, wherein the time of day module is to periodically update the first time of day based on (i) the compensation value, and (ii) a difference between (a) the first time of day as stored in the first one or more time of day registers and (b) a grandmaster time of the grandmaster clock signal.

9. A system comprising:
the network device of claim 8; and
the control module further to (i) compare the first time of day to the grandmaster clock signal, and (ii) update the compensation value based on a difference between the first time of day and the grandmaster time.

10. The system of claim 9, wherein:
the timing module further comprises an accumulation module;

the accumulation module is to, for a plurality of cycles of the grandmaster clock signal, accumulate nanoseconds of differences between the first time of day and the grandmaster time to generate an accumulated value; and the time of day module is further to, based on the accumulated value, update the first time of day stored in the second one or more time of day registers.

11. A system comprising:

the network device of claim 1; and the control module further to (i) compare the first time of day to the grandmaster clock signal, (ii) update the compensation value based on a difference between the first time of day and the grandmaster clock signal, and (iii) based on the difference between the first time of day and a grandmaster time of the grandmaster clock signal, reset the first one or more time of day registers, the second one or more time of day registers, and the loadpoint register.

12. A system comprising:

the network device of claim 1; and the control module, wherein the network device comprises a second port, the first port is further to (i) receive a first synchronization frame, and (ii) timestamp the first synchronization frame, wherein the timestamp indicates a time when the first synchronization frame is received at the first port, the control module is further to (i) receive the first synchronization frame from the first port, (ii) generate a second synchronization frame including the timestamp of the first synchronization frame, and (iii) while or subsequent to generating the second synchronization frame, generating a follow up frame corresponding to the second synchronization frame, and the first port or the second port is to (i) receive the second synchronization frame and the follow up frame from the control module, (ii) transmit the synchronization frame and the follow up frame from the network device, and (iii) perform one or more of (a) generating an egress timestamp for the second synchronization frame while transmitting the second synchronization frame from the network device, converting the egress timestamp to an egress time based on the time of day stored in the second one or more time of day registers, and prior to transmitting the follow up frame from the network device, updating a timestamp field of the follow up frame to indicate the egress time of the second synchronization frame from the first port or the second port, and (b) calculating a residence time based on the timestamp of the first synchronization frame and the egress timestamp of the second synchronization frame, and prior to transmitting the follow up frame from the network device, updating a correction field of the follow up frame based on the residence time.

13. A system comprising:

the network device of claim 1; and the control module, wherein the first port is to (i) receive a request frame, and (ii) timestamp the request frame, wherein the timestamp indicates a time when the request frame is received at the port, the control module is to (i) receive the request frame from the first port, (ii) generate a response frame including the timestamp of the request frame, and (iii) while or subsequent to generating the response frame, generating a follow up frame corresponding to the response frame, and the first port is further to (i) receive the response frame and the follow up frame from the control module, (ii) transmit the response frame and the follow up frame from the network device, and (iii) perform one or more of (a) generating an egress timestamp for the response frame while transmitting the response frame from the network device, converting the egress timestamp to an egress time based on the time of day stored in the second one or more time of day registers, and prior to transmitting the follow up frame from the network device, updating a timestamp field of the follow up frame to indicate the egress time of the response frame from the port, and (b) calculating a turnaround time based on the timestamp of the request frame and the egress timestamp of the response frame, and prior to transmitting the follow up frame from the network device, updating a correction field of the follow up frame based on the turnaround time.

14. A method of operating a network device, wherein the network device comprises a first port, wherein the first port comprises a register module and a timing module, wherein the register module comprises a first one or more time of day registers and a loadpoint register, wherein the timing module comprises a second one or more time of day registers and a time of day module, the method comprising:

receiving a first time of day from a control module at the register module, wherein the control module is separate from the network device, and wherein the first time of day is a future time and is based on a grandmaster clock signal;

storing the first time of day in the first one or more time of day registers;

storing an initial hardware time in the loadpoint register, wherein the control module selects the initial hardware time;

storing a compensation value received from the control module in a compensation register, wherein the compensation value is determined based on a difference between a local clock signal and the grandmaster clock signal;

operating the timing module based on the local clock signal; and when a local hardware time of the timing module matches the initial hardware time, (i) transferring the first time of day from the first one or more time of day registers to the second one or more time of day registers, (ii) begin updating the first time of day stored in the second one or more time of day registers based on the local clock signal, and (iii) updating the first time of day based on the compensation value.

15. The method of claim 14, further comprising:
storing an enable bit in an enable register of the register module, wherein the enable bit is set by the control module; and
subsequent to the control module setting the enable bit and based on the local clock signal, updating the first time of day stored in the second one or more time of day registers,
wherein the transferring of the first time of day from the first one or more time of day registers to the second one or more time of day registers is performed subsequent to the control module setting the enable bit.

16. The method of claim 14, wherein:
the first one or more time of day registers include a first time of day register and a second time of day register;
the first time of day register and the second time of day register are to store respective portions of the first time of day;
the second one or more time of day registers include a third time of day register and a fourth time of day register; and
when the local hardware time of the timing module matches the initial hardware time, (i) the first time of day is transferred from the first one or more time of day registers to the second one or more time of day registers, and (ii) the first time of day stored in the second one or more time of day registers is updated based on the local clock signal.

17. The method of claim 16, further comprising:
storing a capture bit in a capture register of the register module, wherein the capture bit is set by the control module; and
subsequent to the control module setting the capture bit, (i) capturing the first time of day by transferring the first time of day from the third time of day register and the fourth time of day register to the first time of day register and the second time of day register, and (ii) capturing the local hardware time in the loadpoint register.

18. The method of claim 17, wherein:
incrementing a counter in the timing module based on the local clock signal;
generating the local hardware time based on a value of the counter;
based on the local hardware time, determine, via the control module, an amount of drift of the first time of day by comparing the time of day captured in the first time of day register and the second time of day register to a grandmaster time indicated via the grandmaster clock signal; and
adjusting the compensation value based on the amount of drift.

19. The method of claim 14, further comprising:
periodically updating the first time of day based on (i) the compensation value, and (ii) a difference between (a) the first time of day as stored in the first one or more time of day registers and (b) a grandmaster time of the grandmaster clock signal;
comparing the first time of day to the grandmaster clock signal; and
updating the compensation value based on a difference between the first time of day and the grandmaster time.

20. The method of claim 19, further comprising:
for a plurality of cycles of the grandmaster clock signal, accumulating nanoseconds of differences between the first time of day and the grandmaster time to generate an accumulated value; and
based on the accumulated value, updating the first time of day stored in the second one or more time of day registers.

21. The method of claim 14, further comprising:
comparing the first time of day to the grandmaster clock signal at the control module;
updating the compensation value based on a difference between the first time of day and the grandmaster clock signal; and
based on the difference between the first time of day and a grandmaster time of the grandmaster clock signal, resetting the first one or more time of day registers, the second one or more time of day registers, and the loadpoint register.

22. The method of claim 14, further comprising:
receiving a first synchronization frame at the first port;
timestamping the first synchronization frame via the first port, wherein the timestamp indicates a time when the first synchronization frame is received at the first port;
receiving the first synchronization frame from the first port at the control module
generating a second synchronization frame including the timestamp of the first synchronization frame;
while or subsequent to generating the second synchronization frame, generating a follow up frame corresponding to the second synchronization frame;
receiving the second synchronization frame and the follow up frame from the control module at the first port or a second port of the network device;
transmitting the synchronization frame and the follow up frame from the network device via the first port or the second port; and
performing one or more of
(a) generating an egress timestamp for the second synchronization frame while transmitting the second synchronization frame from the first port or the second port, converting the egress timestamp to an egress time based on the time of day stored in the second one or more time of day registers, and prior to transmitting the follow up frame from the first port or the second port, updating a timestamp field of the follow up frame to indicate the egress time of the second synchronization frame from the first port or the second port, and
(b) calculating a residence time based on the timestamp of the first synchronization frame and the egress timestamp of the second synchronization frame, and prior to transmitting the follow up frame from the first port or the second port, updating a correction field of the follow up frame based on the residence time.

23. The method of claim 14, further comprising
receiving a request frame at the first port;
timestamping the request frame, wherein the timestamp indicates a time when the request frame is received at the first port;
receiving the request frame from the first port at the control module in the network device;
generating a response frame including the timestamp of the request frame;
while or subsequent to generating the response frame, generating a follow up frame corresponding to the response frame;
receiving the response frame and the follow up frame from the control module at the first port;
transmitting the response frame and the follow up frame from the first port; and performing one or more of
- (a) generating an egress timestamp for the response frame while transmitting the response frame from the port, converting the egress timestamp to an egress time based on the time of day stored in the second one or more time of day registers, and prior to transmitting the follow up frame from the port, updating a timestamp field of the follow up frame to indicate the egress time of the response frame from the port, and
- (b) calculating a turnaround time based on the timestamp of the request frame and the egress timestamp of the response frame, and prior to transmitting the follow up frame from the port, updating a correction field of the follow up frame based on the turnaround time.

\* \* \* \* \*